(12) United States Patent
Tristan et al.

(10) Patent No.: US 10,496,929 B2
(45) Date of Patent: Dec. 3, 2019

(54) DATA-PARALLEL PROBABILISTIC INFERENCE

(71) Applicant: Oracle International Corporation, Redwood Shores, CA (US)

(72) Inventors: Jean-Baptiste Tristan, Cambridge, MA (US); Guy L. Steele, Jr., Lexington, MA (US); Daniel E. Huang, Cambridge, MA (US); Joseph Tassarotti, Pittsburgh, PA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1136 days.

(21) Appl. No.: 14/316,186

(22) Filed: Jun. 26, 2014

(65) Prior Publication Data

US 2015/0095277 A1    Apr. 2, 2015

Related U.S. Application Data

(60) Provisional application No. 61/884,807, filed on Sep. 30, 2013.

(51) Int. Cl.
    *G06N 7/00* (2006.01)
(52) U.S. Cl.
    CPC .................. *G06N 7/005* (2013.01)
(58) Field of Classification Search
    None
    See application file for complete search history.

(56) References Cited

U.S. PATENT DOCUMENTS

| 8,484,245 B2 | 7/2013 | Ha-Thuc |
| 9,767,416 B2 | 9/2017 | Tristan |

(Continued)

OTHER PUBLICATIONS

Paige, B. et al. (Mar. 3, 2014). "A Compilation Target for Probabilistic Programming Languages". In Proceedings of the 31st International Conference on Machine Learning (ICML-14), pp. 1935-1943.*

(Continued)

*Primary Examiner* — Kamran Afshar
*Assistant Examiner* — Benjamin J Buss
(74) *Attorney, Agent, or Firm* — Hickman Palermo Becker Bingham LLP

(57) ABSTRACT

The present invention relates to a probabilistic programming compiler that (a) generates data-parallel inference code to sample from probability distributions in models provided to the compiler; and (b) utilizes a modular framework to allow addition and removal of inference algorithm information based on which the compiler generates the inference code. For a given model, the described compiler can generate inference code that implements any one or more of the inference algorithms that are available to the compiler. The modular compiler framework utilizes an intermediate representation (IR) that symbolically represents features of probability distributions. The compiler then uses the IR as a basis for emitting inference code to sample from the one or more probability distributions represented in the IR. Further, the compiler produces parallelized inference code that facilitates efficient parallel processing of inference computations in order to take advantage of highly data-parallel architectures, such as GPUs.

20 Claims, 9 Drawing Sheets

(56) References Cited

U.S. PATENT DOCUMENTS

| | | | | |
|---|---|---|---|---|
| 2009/0319458 | A1* | 12/2009 | Minka | G06N 5/04 706/46 |
| 2012/0095952 | A1 | 4/2012 | Archambeau | |
| 2013/0159236 | A1 | 6/2013 | Vladislav | |
| 2014/0101090 | A1* | 4/2014 | Gordon | G06N 7/005 706/52 |
| 2014/0129510 | A1 | 5/2014 | Vladislav | |
| 2014/0149433 | A1 | 5/2014 | Lakshminarayan | |
| 2014/0181214 | A1 | 6/2014 | Price | |
| 2014/0250046 | A1* | 9/2014 | Winn | G06N 5/04 706/52 |
| 2015/0058337 | A1* | 2/2015 | Gordon | G06N 7/005 707/736 |
| 2015/0268930 | A1 | 9/2015 | Lee | |
| 2016/0210718 | A1 | 7/2016 | Tristan et al. | |
| 2016/0224544 | A1 | 8/2016 | Tristan et al. | |
| 2016/0224900 | A1 | 8/2016 | Steele, Jr. | |
| 2016/0224902 | A1 | 8/2016 | Steele, Jr. et al. | |
| 2016/0350411 | A1 | 12/2016 | Tristan | |
| 2017/0039265 | A1 | 2/2017 | Steele, Jr. | |
| 2017/0154077 | A1 | 6/2017 | Kang | |

OTHER PUBLICATIONS

Piatkowski, N. et al. (2011). "Parallel inference on structured data with CRFs on GPUs." International Workshop at ECML PKDD on Collective Learning and Inference on Structured Data (COLISD2011). 12 pages.*

Bishop, C.M. (2013). "Model-based machine learning". Philosophical Transactions of the Royal Society of London A: Mathematical, Physical and Engineering Sciences 371:1984. Feb. 13, 2013. 17 pages. Pub. Dec. 31, 2012. http://dx.doi.org/10.1098/rsta.2012.0222.*

Kiselyov, O. et al. (2009). "Embedded probabilistic programming". In Domain-Specific Languages (pp. 360-384). Springer Berlin Heidelberg.*

Koller, D., McAllester, D., and Pfeffer, A., "Effective Bayesian Inference for Stochastic Programs". In Proceedings of the 14th National Conference on Artificial Intelligence, dated 1997, 8 pages.

Kiselyov, O. and Shan, C.-C. "Embedded Probabilistic Programming", In Proceedings of the IFIP TC 2 Working Conference on Domain-Specific Languages , 2009, pp. 360-384. Springer-Verlag, 25 pages.

Lunn, D., Spiegelhalter, D., Thomas, A., and Best, N. "The BUGS Project: Evolution, Critique and Future Directions", Statistics in Medicine , 2009, 19 pages.

Bache, K. and Lichman, M. "UCI Machine Learning Repository", 2013. URL http://archive.ics.uci.edu/ml, 2 pages.

Blelloch, G. E. "Programming Parallel Algorithms". Communications of the ACM, 39:85-97, 1996, 13 pages.

Goodman et al., "Church: A Language for Generative Models", In Proceedings of the 24th Conference on Uncertainty in Artificial Intelligence, UAI 2008, pp. 220-229, dated 2008, 10 pages.

Goodman, N. D. "The Principles and Practice of Probabilistic Programming"., Proceedings of the 40th annual ACM SIGPLAN-SIGACT Symposium on Principles of Programming Languages, dated 2013, 3 pgs.

Griffiths, T. L. and Steyvers, M. "Finding Scientific Topics". In Proceedings of the National Academy of Sciences of the United States of America , vol. 101, 2004, 8 pages.

Hershey et al., "Accelerating inference:Towards a Full Language,", compiler and hardwarestack. CoRR , abs/1212.2991, 2012, 8 pages.

Hillis,W. D. and Steele, Jr., G. L., "Data Parallel Algorithms", Communications of the ACM , 29(12):1170-1183, 1986, 14 pages.

Blei, David M., Ng, Andrew Y., and Jordan, Michael I. "Latent Dirichlet Allocation", Journal of Machine Learning Research, 3:993-1022, dated 2003, 30 pages.

Hoffman, M., Blei, D., Wang, C., and Paisley, J. "Stochastic Variational Inference", Journal of Machine Learning Research , 14:1303-1347, dated 2013, 45 pages.

Yao et al., "A. Efficient Methods for Topic Model Inference on Streaming Document Collections", 15th ACM SIGKDD International Conference on Knowledge Discovery and Data Mining, AMC, 2009, 9 pages.

Low et al., "A New Framework for Parallel Machine Learning", CoRR , abs/1006.4990, dated 2010, 10 pages.

McCallum et al. "Probabilistic Programming Via Imperatively Defined Factorgraphs in Advances in Neural Information Processing Systems 22" , pp. 1249-1257, 2009, 9 pages.

Minka, T., Winn, J.M., Guiver, J.P., and Knowles, D.A. "Infer.NET 2.5", 2012. URL http://research.microsoft.com/infernet . Microsoft Research Cambridge, 4 pages.

Neal, Radford. "CSC 2541: Bayesian Methods for Machine Learning", 2013. Lecture 3, 20 pages.

Pfeffer, A. "Creating and Manipulating Probabilistic Programs With Figaro", In 2nd International Workshop on Statistical Relational AI , 2012, 10 pages.

Pfeffer, A. "The Design and Implementation of IBAL: A General-Purpose Probabilistic Language", Introduction to Statistical Relational Learning , pp. 399-433, 2007, 45 pages.

Pfeffer, A. Figaro: "An Object-Oriented Probabilistic Programming Language", Technical report, Charles River Analytics, dated 2009, 9 pages.

Plummer, Martyn. Jags: "A Program for Analysis of Bayesian Graphical Models Using Gibbs Sampling", Pro. of the 3rd International Workshop on Distributed Statistical Computing, Mar. 2013, 10 pgs.

Venugopal, D. and Gogate, V. "Dynamic Blocking and Collapsing for Gibbs Sampling", In 29th Conference on Uncertainty in Artificial Intelligence , UAI'13, 2013, 10 pages.

Hoffman, M. D. and Gelman, A., "The No-U-turn Sampler: Adaptively Setting Path Lengths in Hamiltonian Monte Carlo", Journal of Machine Learning Research , In press., dated Apr. 2014, 31 pages.

Rosen-Zvi et al., "Learning Author-Topic Models from Text Corpora", 2004 Uncertainty in AI Conference and the 2004 ACM SIGKDD Conference, dated 2010, AMC, 38 pages.

Tristan, U.S. Appl. No. 14/755,312, filed Jun. 30, 2015, Notice of Allowance, dated Mar. 10, 2017.

U.S. Appl. No. 14/755,312, filed Jun. 30, 2015, Office Action, dated Oct. 3, 2016.

Stucki et al., "What are the Odds? Probabilistic Programming in Scala", Scala '13, Montpellier, France, ACM, dated 2013, 9 pages.

Tristan, U.S. Appl. No. 14/599,272, filed Jan. 16, 2015, Office Action, dated Sep. 25, 2017.

Tristan, U.S. Appl. No. 14/599,272, filed Jan. 16, 2015, Final Office Action, Nov. 15, 2017.

Steele Jr., U.S. Appl. No. 14/821,511, filed Aug. 7, 2015, Interview Summary, dated May 11, 2018.

Brown, U.S. Appl. No. 15/074,248, filed Mar. 18, 2016, Notice of Allowance, dated Apr. 24, 2018.

Steele, Jr., U.S. Appl. No. 14/820,169, filed Aug. 6, 2015, Notice of Allowance, dated Jul. 23, 2018.

Steele Jr., U.S. Appl. No. 14/821,511, filed Aug. 7, 2015, Notice of Allowance, dated Aug. 6, 2018.

Steele Jr. U.S. Appl. No. 14/713,205, filed May 15, 2015, Notice of Allowance, dated Sep. 21, 2018.

Tristan, U.S. Appl. No. 14/599,272, filed Jan. 16, 2015, Advisory Action, dated Jan. 24, 2018.

Steele, U.S. Appl. No. 14/713,205, filed May 15, 2015, Office Action, dated Mar. 8, 2018.

Steele Jr, U.S. Appl. No. 14/821,511, filed Aug. 7, 2015, Office Action, dated Feb. 9, 2018.

Steele Jr, U.S. Appl. No. 14/820,169, filed Aug. 6, 2015, Office Action, dated Feb. 27, 2018.

Zhao, Huasha, Jiang, Biye, and Canny, John. "SAME but Different: Fast and High-quality Gibbs Parameter Estimation". CoRR, abs/1409.5402, 2014, 10 pages, Sep. 18, 2014.

Marsaglia, George, "A Simple Method for Generating Gamma Variables", ACM Transactions on Mathematical Software, vol. 26, No. dated 3, Sep. 2000, 10 pages.

* cited by examiner

FIG. 2

```
1  object LDA {                                    ← 202
2  class sig(var phi : Array[Double],
3            var theta : Array[Double],
4            var z : Array[Int],
5            var w : Array[Int])
6                                                  ← 204
7  val model = bayes {
8    (K: Int, V: Int, M: Int, N: Array[Int]) => {
9      val alpha = vector(K,0 1)
10     val beta = vector(V,0.1)
11     val phi = Dirichlet(V,beta).sample(K)
12     val theta = Dirichlet(K,alpha) sample(M)
13     val w =
14       for(i <- 1 to M) yield {
15         for(j <- 1 to N(i)) yield {
16           val z: Int =
17             Categorical(K,theta(i)).sample()
18           Categorical(V,phi(z)).sample()
19       }}
20     observe(w)
21  }}}
```

```
1  object LinearRegression {
2  class sig(var w: Array[Double], var b: Double,
3             var tau  Double, var x: Array[Double],
4             var y: Array[Double])
5
6  val model = bayes {
7   (K: Int, N: Int, l: Double, u: Double) => {
8
9     val w = Gaussian(0, 10) sample(K)
10    val b = Gaussian(0, 10).sample()
11    val tau = InverseGamma(3.0, 1.0).sample()
12    val x = for(i <- 1 to N)
13        yield Uniform(l, u).sample(K)
14    val y = for (i <- 1 to N) yield {
15      val phi = for(j <- 1 to K) yield w(j) * x(i)(j)
16      Gaussian((phi sum) + b, tau).sample()
17    }
18  observe(x, y)
19 }}}
```

```
1  val phi = new Array[Double](k * v)
2  val theta_train = new Array[Double](doc_num_train * k)
3  val z_train = new Array(num_tokens_train)
4  val s_train = new LDA.sig(phi, theta_train, z_train, w_train)
5  LDA.model.map(Set(), (k, v, doc_num_train, docs_length_train), s_train,
                samples_num, Infer.GIBBS)
6
7  val z_test = new Array(num_tokens_test)
8  val theta_test = new Array[Double](doc_num_test * k)
9  val s_test = new LDA.sig(phi, theta_test, z_test, w_test)
10 LDA.model.map(Set("phi"), (k, v, doc_num_test, docs_length_test), s_test,
                samples_num, Infer.GIBBS)
```

502: COMPILE SOURCE CODE, REPRESENTING A MODEL OF A BODY OF DATA, INTO AN INTERMEDIATE REPRESENTATION OF THE MODEL, WHEREIN THE MODEL OF THE BODY OF DATA SPECIFIES ONE OR MORE PROBABILITY DISTRIBUTIONS; WHEREIN THE INTERMEDIATE REPRESENTATION OF THE MODEL REPRESENTS AT LEAST ONE PROBABILITY DISTRIBUTION, OF THE ONE OR MORE PROBABILITY DISTRIBUTIONS, WITH ONE OR MORE MATHEMATICAL EXPRESSIONS

504: IDENTIFY A PARTICULAR INFERENCE ALGORITHM OF A PLURALITY OF INFERENCE ALGORITHMS

506: PRODUCE INFERENCE CODE THAT IMPLEMENTS THE PARTICULAR INFERENCE ALGORITHM; WHEREIN THE INFERENCE CODE IS CONFIGURED TO SAMPLE FROM THE AT LEAST ONE PROBABILITY DISTRIBUTION OF THE ONE OR MORE PROBABILITY DISTRIBUTIONS; AND WHEREIN PRODUCING THE INFERENCE CODE IS BASED, AT LEAST IN PART, ON AN ANALYSIS OF THE ONE OR MORE MATHEMATICAL EXPRESSIONS

FIG. 6

$$P ::= p(\vec{X}) \mid p(\vec{X} \mid \vec{X}) \mid PP \mid \frac{1}{P} \quad \text{— 600}$$

$$\mid \prod_i^N P \mid \int_X P\, dx \mid (P)_c$$

$$f(\mathbf{x}, \mathbf{y}, \tau, b, \mathbf{w}) = p(b)p(\tau)p(\mathbf{w})p(\mathbf{x})p(\mathbf{y} \mid \mathbf{x}, b, \tau, \mathbf{w}) \quad \text{— 610}$$

$$p(b)p(\tau)\left(\prod_k^K p(w_k)\right)\left(\prod_n^N p(x_n)p(y_n \mid \mathbf{x_n} \cdot \mathbf{w} + b, \tau)\right) \quad \text{— 620}$$

FIG. 7

$$p(\theta_m^{\tau+1} | w^{\tau+1}, z^{\tau+1}, \theta_1^{\tau+1}, \ldots, \theta_{m-1}^{\tau+1}, \theta_{m+1}, \ldots, \theta_M) \qquad \text{— 700}$$

(a) $\dfrac{P}{P} \to 1$ (b) $\int P(x) Q\, dx \to Q \int P(x)\, dx$ (c) $\prod_i^N P(x_i) \to \prod_i^N (P(x_i))_{q(i)=true} \prod_i^N (P(x_i))_{q(i)=false}$ — 710

(d) $P(x) \to \dfrac{P(x,y)}{\int P(x,y)\, dy}$ $$\dfrac{p(\theta_m^{\tau+1}) \prod_j^{N(m)} p(z_{m,j} | \theta_m^{\tau+1})}{\int p(\theta_m^{\tau+1}) \prod_j^{N(m)} p(z_{m,j} | \theta_m^{\tau+1})\, d\theta_m^{\tau+1}} \qquad \text{— 720}$$

$$p(\phi_k^{\tau+1} | w^{\tau+1}, z^{\tau+1}, \theta^{\tau+1}, \phi_1^{\tau+1}, \ldots, \phi_{k-1}^{\tau+1}, \phi_{k+1}, \ldots, \phi_K) \qquad \text{— 730}$$

$$\dfrac{p(\phi_k) \prod_i^M \prod_j^{N(i)} (p(w_{i,j} | \phi_{z_{i,j}}))_{k=z_{i,j}}}{\int p(\phi_k) \prod_i^M \prod_j^{N(i)} (p(w_{i,j} | \phi_{z_{i,j}}))_{k=z_{i,j}}\, d\phi_k} \qquad \text{— 740}$$

$$\prod_i^M \prod_j^{N(i)} (p(w_{i,j} | \phi_{z_{i,j}}))_{k=z_{i,j}} \qquad \text{— 750}$$

FIG. 8

---
Algorithm 1 Sampling from K Dirichlet Variates
---
    Input: matrix $a$ of size $k$ by $n$
    for $i = 0$ to $n - 1$ in parallel do
        for $j = 0$ to $k - 1$ do
            $v[i, j] \sim \text{Gamma}(a[i, j])$
        end for
        $v \times 1$
    end for
    Output: matrix $v$
---

800

DATA-PARALLEL PROBABILISTIC INFERENCE

BENEFIT CLAIM

This application claims the benefit of Provisional Appln. 61/884,807, titled "Method And System For Executing Probabilistic Programs In Parallel" and filed Sep. 30, 2013, the entire contents of which is hereby incorporated by reference as if fully set forth herein, under 35 U.S.C. § 119(e).

FIELD OF THE INVENTION

The present invention relates to a probabilistic programming compiler that (a) generates data-parallel inference code to sample from probability distributions in models provided to the compiler; and (b) utilizes a modular framework to allow addition and removal of inference algorithm information, based on which the compiler generates the inference code.

BACKGROUND

Machine learning facilitates complex, statistics-based computations such as speech recognition, image recognition, retrieving information from unorganized text, etc. However, machine learning, and especially probabilistic modeling, can be difficult to apply. To apply machine learning, a user needs to not only design a statistical model, but to also design and implement the right inference procedure to perform inference on the model. There are many different inference algorithms, most of which are conceptually complicated and difficult to implement at scale. Despite the enthusiasm that many people who practice data analysis have for machine learning, this complexity is a barrier to deployment.

Probabilistic programming is a way to simplify the application of machine learning based on Bayesian inference. The key feature of probabilistic programming is separation of concerns: a user specifies what needs to be learned by describing a probabilistic model, while a compiler automatically generates the inference procedure for the described model. In particular, the programmer writes source code that describes one or more probability distributions, and the source code is parsed by a probabilistic programming compiler. The compiler then generates inference code that implements an inference algorithm configured to sample from the one or more described distributions. Using the compiler-generated inference code, the programmer samples from the described distribution(s).

Doing inference on probabilistic programs is computationally intensive and challenging. Most of the algorithms developed to perform inference are conceptually complicated, and it is not clear, especially for non-experts, which algorithm would work best for a given model. It would be beneficial to facilitate selection of an inference algorithm in the context of probabilistic programming.

Furthermore, the amount of data being analyzed via inference code is often voluminous, and a large amount of computation power is required to process such data. In order to produce efficient inference code, it would be beneficial to develop techniques that process large amounts of data efficiently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts an example Latent Dirichlet Allocation (LDA) model specification.

FIG. 3 depicts an example regression model specification.

FIG. 4 depicts a procedure for initiating sampling of an LDA model.

FIG. 5 depicts a flowchart for creating an intermediate representation from a provided model specification and producing inference code, implementing a particular inference algorithm, to sample from one or more probability distributions specified in the provided model.

FIGS. 6 and 7 depict mathematical expressions.

FIG. 8 depicts a procedure to sample from K Dirichlet variates.

DETAILED DESCRIPTION

Figure 1:
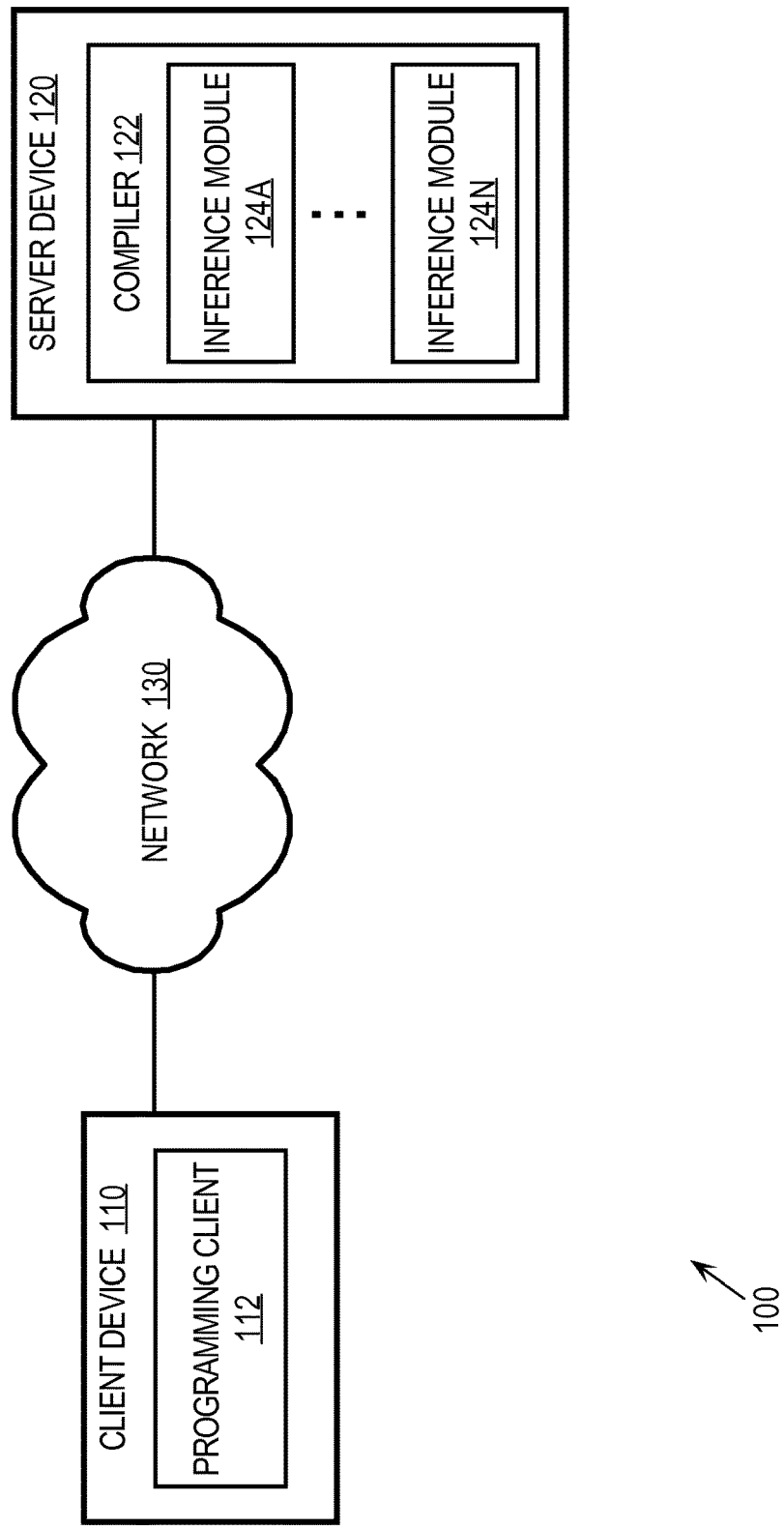
FIG. 1 is a block diagram that depicts an example network arrangement for a probabilistic programming system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

For probabilistic programming to perform well, an appropriate inference algorithm should be selected for a given statistical model. A statistical model is a description of one or more probability distributions of a particular body of data. Some data models are best sampled using one or more particular inference algorithms. Thus, if a particular compiler only emits inference code for a particular inference algorithm (such as Metropolis-Hastings, Gibbs, or Slice, etc.), then there are models for which the compiler will be of little or no use, even given large amounts of computational power.

Described herein is a probabilistic programming compiler with a modular framework, which facilitates addition and removal of inference algorithm information that the compiler may use to create inference code. Thus, for a given model, the described compiler can generate inference code that implements any one or more of the inference algorithms that are available to the compiler. Such flexibility facilitates experimentation to determine which inference algorithm(s) work best for a given model by allowing a user to create samplers based on any of the inference algorithms available to the compiler.

The modular compiler framework of the described compiler utilizes an intermediate representation (IR) that symbolically represents features of probability distributions. Specifically, when the compiler receives a model specification, the compiler creates an IR that symbolically represents features of one or more probability distributions specified by the received model specification. The compiler then uses the created IR as a basis for emitting inference code to sample from the one or more probability distributions.

Any class of probability distribution may be parsed by the compiler as long as the compiler has information indicating how to create an IR that represents features of the class of probability distribution. Further, the compiler can emit inference code that implements any inference algorithm as long as the compiler has information about how to create inference code, based on probability distribution features represented in an IR, that implements the particular algorithm. Thus, the intermediate representation described herein facilitates scaling application of the compiler to various combinations of inference algorithms being used to sample from various classes of probability distributions.

Furthermore, probabilistic programming performance is enhanced by utilizing advances in parallel computing hardware to perform computations in parallelized inference code. For example, many MCMC inference algorithms are highly data-parallel within a single Markov Chain if advantage is taken of the conditional independence relationships of the input model (e.g., the assumption of independent and identically distributed (i.i.d.) data makes the likelihood independent across data points).

Thus, described herein is a probabilistic programming language and compiler for Bayesian networks designed to make effective use of data-parallel architectures such as Graphics Processing Units (GPUs). A GPU is a processor with a highly parallel structure, having a plurality of execution units called "cores" (e.g., tens, hundreds, or thousands of cores, etc.). Each core of a GPU is configured to process a thread of computation in parallel with the functioning of the other cores of the GPU.

The described compiler produces parallelized inference code configured to be run by a GPU (or other data-parallel architecture such as a distributed system). An example of a type of code configured to be run on a GPU is Compute Unified Device Architecture (CUDA) code, which utilizes a GPU for general processing. Parallelized inference code facilitates parallel processing of inference computations in order to take advantage of the GPU's parallel structure and therefore speed up processing the computations. In embodiments, the compiler can generate data-parallel inference code scalable to thousands of GPU cores by making use of the conditional independence relationships in the Bayesian network.

Probabilistic Programming Architecture

FIG. 1 is a block diagram that depicts an example network arrangement 100 for a probabilistic programming system, according to embodiments. Network arrangement 100 includes a client device 110 and a server device 120 communicatively coupled via a network 130. Example network arrangement 100 may include other devices, including client devices, server devices, and display devices, according to embodiments.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a programming client 112. Programming client 112 may be implemented in any number of ways, including as a stand-alone application running on client device 110, as a plugin to a browser running at client device 110, etc. Programming client 112 may be implemented by one or more logical modules. Client device 110 may be configured with other mechanisms, processes and functionalities, depending upon a particular implementation.

Network 130 may be implemented with any type of medium and/or mechanism that facilitates the exchange of information between client device 110 and server device 120. Furthermore, network 130 may facilitate use of any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with a compiler 122. Compiler 122 has access to two or more inference modules 124A-N, i.e., via a modular compiler framework described in further detail below. Any of the functionality attributed to compiler 122 herein may be performed by another logical entity running on server device 120, or on client device 110, or on other devices that are communicatively coupled to network 130, according to embodiments. Compiler 122 may be implemented by one or more logical modules. Server device 120 may be configured with other mechanisms, processes and functionalities, depending upon a particular implementation.

Programming client 112 and/or compiler 122 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130. Further, programming client 112 and/or compiler 122 may send one or more communications, using any of the above protocols or any other communication protocol, over network 130 to one of the other entities communicatively coupled to network 130, according to embodiments.

In an embodiment, each of the processes described in connection with programming client 112 and/or compiler 122 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Probabilistic Programming—Model Specification

To initiate probabilistic programming to do inference on a particular data model with one or more probability distributions, a user provides, to compiler 122, source code that represents a specification of the data model. Such source code may be developed and provided to compiler 122 via programming client 112 of client device 110. Source code is computer code written in a human-readable programming language such as Scala, C++, Java, etc.

Compiler 122 parses the source code, which transforms the source code to a target computer language, such as a computer-readable language that instructs a GPU or a CPU of a computing device to perform tasks indicated by the source code. As such, compiler 122 parses the source code that describes the data model, and causes server device 120 to create, from the parsed source code, a representation (i.e., an IR) of the data model as described in further detail herein.

FIG. 2 depicts an example Latent Dirichlet Allocation (LDA) model specification 200, which is source code that describes one or more probability distributions of the LDA model. According to embodiments, compiler 122 is a Scala compiler, and the probability distributions in specification

200 are defined for compiler 122 using Scala objects. However, within embodiments, data model specifications may be in any source language (e.g., Scala, Java, C++, etc.) that is capable of conveying information needed to define a data model.

According to the embodiment of FIG. 2, the probability distribution described in specification 200 is defined as a Scala object (object LDA) and is composed of two declarations. First, the support of the probability distribution is declared as a class 202 named "sig". This support is composed of four arrays, with one array each for the distribution of topics per document (theta), the distribution of words per topic (phi), the topics assigned to the words (z), and the words in the corpus (w). This support is used to store the inferred model parameters. These last two arrays are flat representations of ragged arrays, and so do not require the documents to be of equal length.

The second declaration 204 of specification 200 specifies the Bayesian network associated with LDA and makes use of a domain-specific language (DSL) for Bayesian networks. The DSL is marked by the "bayes" keyword and delimited by the following enclosing brackets. The model first declares the parameters of the model: "K" for the number of topics, "V" for the vocabulary size, "M" for the number of documents, and "N" for the array that associates each document with its size.

In the model itself, the hyper-parameters (values "alpha" and "beta") are defined for the Dirichlet distributions and draw K Dirichlet samples of dimension V for the distribution of words per topic (phi) and M Dirichlet samples of dimension K for the distribution of topics per document (theta). Then, for each word in each document, a topic z is drawn from theta, and finally a word from phi based on the topic drawn for z.

FIG. 3 depicts a regression model specification 300, which is defined in the same way as the model depicted in FIG. 2, and uses similar language features. In the example of model specification 300, the support comprises the "(x, y)" data points, the weights "w", the bias "b", and the noise "tau". The model uses an additional sum function to sum across the feature vector.

Using a Specified Model

According to embodiments, once a model specification is parsed, it can be used as any other Scala object by writing standard Scala code. For instance, one may use the LDA model specified in FIG. 2 with a training corpus to learn a distribution of words per topic and then use it to learn the per-document topic distribution of a test corpus.

Scala code implementation 400 of FIG. 4 represents such an implementation procedure, according to an embodiment, using the LDA model specified in FIG. 2. The function LDA.model.map returns a maximum a posteriori estimation. The function takes, as arguments, the set of variables to observe (on top of the ones declared as observed in the model specification), the hyperparameters, the initial parameters, the output parameters, the number of iterations, and the inference to use. The parameters are stored in LDA.sig.

The implementation of FIG. 4 allocates the parameter arrays, which contain the inferred values. Then the signature of the model is constructed which encapsulates the parameters. The LDA.model.map command returns the MAP estimate of the parameters given the observed words.

To test the model, a new signature is constructed containing the test documents and the previously inferred phi values. Then LDA.model.map is called again, but with both the phis and the words observed (by supplying Set("phi")). The inferred thetas for the test documents are stored in s_test.theta.

A Modular Compilation Framework

According to embodiments, there are two distinct compilation phases when a model goes from a specification down to inference code. The first compilation phase happens when the programmer compiles a model specification such as specification 200 of FIG. 2. According to an embodiment, compiler 122 compiles the model specification with scalac as follows (where the source code for specification 200 is stored in a file named LDA.scala):

scalac-classpath augur.jar LDA.scala

The file augur.jar is the package containing compiler 122. The first phase of compilation happens statically, during normal scalac compilation. In this phase, the block of code following the bayes keyword in specification 200 is transformed into an intermediate representation (IR) for probability distributions. This IR represents features of the probability distribution specified in specification 200.

The second compilation phase happens at runtime, when the programmer calls the LDA.model.map method. At that point, the IR is transformed, analyzed, and optimized, and finally, inference code is emitted and run.

The framework of compiler 122 is therefore composed of two distinct components that communicate through the IR: a front end of compiler 122, where model specifications in domain-specific languages are converted into IR, and a back end of compiler 122, where the IR is compiled down to inference code that implements various inference algorithms (such as Metropolis-Hastings, Gibbs sampling, Metropolis-Within-Gibbs, etc.).

According to an embodiment, the Scala macro system is used to define a modeling language in the front end. This macro system facilitates defining a set of functions (called "macros") that will be executed by compiler 122 on the code enclosed by the macro. Example DSLs, for representing classes of probability distributions, used by compiler 122 include Bayesian networks, Markov random fields, etc. Addition of DSLs to the front end of compiler 122 comprises informing the front end of compiler 122 how to convert the DSL to an IR. As such, addition of DSLs to the front end of compiler 122 would not require modification of the back end of compiler 122, which emits inference code based on models represented with IR.

Because the IR is compiled to inference code at runtime, the values of all the hyper-parameters and the size of the dataset are known to compiler 122. This enables compiler 122 to implement better optimization strategies, and also provides information about how to extract parallelism, as described in further detail below. For example, when compiling LDA, the number of topics is known to be much smaller than the number of documents, and thus parallelizing over documents will produce more parallelism than parallelizing over topics.

The back-end of compiler 122 has the capacity to implement those inference algorithms for which the compiler has information, i.e., stored at inference modules 124A-N. Each inference module of inference modules 124A-N has information for creating inference code, to implement a particular inference algorithm, based on IR of a model. In order to expand the capacity of compiler 122 to emit inference code that implements an inference algorithm that was previously unknown to compiler 122, a user creates a new inference module (e.g., inference module 124B) with information indicating how to produce inference code, for a model represented by IR, that implements the new inference algorithm.

Compiler 122 can use one or more of the modular inference algorithms available to compiler 122 to create one or more samplers for statistical models represented with IR. Because compiler 122 creates an intermediate representation of any model that is compiled, no matter how the model is specified (i.e., source language used or class of distribution specified in the model), any of the inference algorithms represented in inference modules 124A-N may be used to create inference code for the specified model, since inference modules 124A-N include information for how to create inference code from the IR of a model. Analysis of an IR that represents a particular model can recover all of the information needed for the inference code generation for that model.

Furthermore, according to an embodiment, compiler 122 has access to a library that defines standard distributions, such as Gaussian, Dirichlet, etc. In addition to these standard distributions, each model specification denotes its own user-defined distribution. According to embodiments, all of these distributions are subtypes of the Dist supertype. Currently, the Dist interface provides two methods: map, which implements maximum a posteriori estimation, and sample, which returns a sequence of samples.

Symbolic Representations of Statistical Models

FIG. 5 depicts a flowchart 500 for creating an IR from a provided model specification and producing inference code, implementing a particular inference algorithm, to sample from one or more probability distributions specified in the provided model. At step 502, source code, representing a model of a body of data, is compiled into an intermediate representation of the model, wherein the model of the body of data specifies one or more probability distributions, and wherein the intermediate representation of the model represents at least one probability distribution, of the one or more probability distributions, with one or more mathematical expressions.

To create a symbolic intermediate representation of a model, compiler 122 parses a model specification represented in source code, and identifies characteristics of the model from the specification. For example, the specification of a particular model instructs compiler 122 to draw a certain number of times from a Gaussian distribution. Upon identifying this instruction, compiler 122 emits a mathematical formula, as part of the symbolic IR of the model, that represents the instruction. To illustrate, compiler 122 emits a mathematical formula that represents a product for every time that the specification indicates to draw from the Gaussian distribution.

As a further example, compiler 122 compiles model specification 300 into an IR of the model, i.e., IR expression 610 of FIG. 6. According to an embodiment, compiler 122 generates IR expressions from the Backus-Naur form grammar 600 of FIG. 6. To create the IR for specification 300, compiler 122 emits IR for a probability density function $f$ that is proportional to the distribution that the user wants to sample from (i.e., the distribution represented in specification 300). The function $f$ is composed of the product of the prior and the likelihood of the model and is extracted automatically by compiler 122 from the provided model specification 300. Thus, applied to the regression example in specification 300, $f$ is defined as shown in IR expression 610 of FIG. 6.

IR expression 610 is a mathematical representation of the probability distribution specified in the regression model represented in specification 300. As such, IR expression 610 symbolically represents features of the specified probability distribution, such as properties of variables for the distribution, and interdependencies between the distribution variables, etc.

The use of such a symbolic (or mathematical) intermediate representation for the model facilitates scaling to large networks. Existing probabilistic programming language implementations, such as JAGS or Stan, utilize a graphical representation of models being processed, rather than symbolic representations of such models. A graphical representation of a model materializes, in memory, values for all (or substantially all) of the data points associated with the model.

A probabilistic programming compiler that utilizes a graphical representation of a model relies on the stored data points to produce inference code that implements a particular inference algorithm to sample from the graphically-represented model. Because all of the data points for the model are materialized in memory, it is relatively easy to pull all of the information, from the materialized graph, that is needed to create a sampler for the represented model. However, graphical representations of models grow linearly as the size of the modeled data grows. Thus, storing and performing analysis on graphical representations of models become unworkable as modeled data grows, resulting in unreasonable memory consumption for graphical representations of models such as LDA.

In contrast with a graphical representation of a model, a symbolic representation of a model is expressed with one or more mathematical expressions. The one or more mathematical expressions summarize classes of data points for the represented model, as well as relationships between the data points in the model. Such a symbolic representation describes one or more probability distributions for a model without instantiating all, or even a substantial portion, of the values of data points of the probability distributions in memory, or in other words, without creating objects that represent the data points of the distribution in memory. The mathematical expressions do not require materialization of a models' data points in memory in order to represent features of the model.

An example that illustrates the difference between symbolic and graphical representations of distributions: compiler 122 parses a specification for a statistical model that models an array of words, where each word in the array is associated with a distinct random variable. A graphical representation of this statistical model would instantiate, in memory, an object that represents each random variable for each word in the array. Thus, if there are a million words in the array, a graphical representation of this model would include a million random variable objects in memory corresponding to the million words, respectively. Further, depending on how the random variables interrelate, a graphical representation of the model would also include instantiated edges between the random variable objects that describe each relationship between the variables.

In contrast, a symbolic representation of this model represents the random variables with a mathematical formula that indicates the product of all of the random variables for the words in the array. The symbolic representation of the model does not instantiate an object for each variable in memory, but includes information in the mathematical formula that symbolically indicates that the model includes a random variable for each word in the array. The symbolic representation describes relationships between the variables using the mathematical formulas rather than with edges that are instantiated in memory.

Generating Metropolis-Hastings Samplers

Returning to flowchart 500, at step 504, a particular inference algorithm, of a plurality of inference algorithms, is identified. To illustrate, in response to an inference procedure (e.g. LDA.model.map) being invoked on a model, compiler 122 initiates the second compilation phase in which compiler 122 emits inference code (such as CUDA code) for the model based on the IR of the model. According to an embodiment, a command invoking an inference procedure on a model includes information about which inference algorithm to use for the inference, such as the reference to "Infer.GIBBS" in the LDA.model.map command of implementation 400 (FIG. 4).

According to an example, a user instructs compiler 122 to use Metropolis-Hastings (MH) inference to emit inference code to sample from a distribution in the model of specification 300, which instruction includes a reference to the MH inference algorithm (such as "Infer.MH"). In this example, compiler 122 has access to information, at inference module 124A, about how to create MH inference code for a provided model based on an IR that represents the model.

At step 506 of flowchart 500, inference code that implements the particular inference algorithm is produced, wherein the inference code is configured to sample from the at least one probability distribution of the one or more probability distributions, and wherein producing the inference code is based, at least in part, on an analysis of the one or more mathematical expressions.

For example, in response to an instruction to use MH inference to sample from a probability distribution represented in IR expression 610, compiler 122 accesses the inference module 124A that corresponds to the requested inference algorithm (MH). Inference module 124A includes information about how to create inference code that implements MH based on the IR of a model, i.e., IR expression 610. Using the symbolic representation (IR 610), compiler 122 identifies characteristics of the data points of the model, which are needed to create inference code for the model.

Compiler 122 uses the information from inference module 124A to create MH inference code based on IR expression 610. To produce MH inference code based on IR expression 610, compiler 122 analyzes IR expression 610 based on information in the library implementation of Metropolis-Hastings, i.e., inference module 124A.

According to an embodiment, inference module 124A includes one or more IR rewrite rules. In the example of MH inference, the rewrite rules are generally-applicable mathematical rules for transforming the IR. As at least part of the analysis of the IR, compiler 122 rewrites IR expression 610 based on the algorithm-specific IR rewrite rules, to produce transformed expression 620 of FIG. 6 (which is equal to expression 610). Compiler 122 produces inference code based on analysis of IR expression 610. According to embodiments, such analysis includes analysis of transformed expression 620 using one or more IR analysis rules.

Identifying Data-Parallelism for the MH Inference Code

It can be challenging to produce inference code that effectively uses the parallelism in highly parallel architectures. Examples herein are given in the context of a GPU and CUDA code, but embodiments are not limited to GPU parallel architecture for implementation of parallelized inference code. Traditional methods of performing inference on a model using a CPU, which generally has one to four cores and is latency oriented, do not always work well with a GPU, which has many more cores than a CPU and is throughput oriented. Programs designed for execution on a CPU do not utilize much parallelism, and would not necessarily run more quickly if implemented on an architecture with more parallelism.

Thus, compiler 122 identifies parallelism in IR, which can be exploited to produce efficient inference code that utilizes the capabilities of a highly parallel architecture. The form of the IR makes the sources of parallelism in the model being processed more explicit. For example, compiler 122 analyzes the probability distributions represented in an IR by applying a set of parallelism rules to the IR to identify portions of the represented probability distribution that may be evaluated in parallel. An example parallelism rule states: a $\Pi$ indicates that each sub-term of the product symbol can be evaluated in parallel.

Based on such analysis of an IR, such as transformed expression 620, compiler 122 identifies that the distribution factorizes into a large number of terms that are independent and can be evaluated in parallel and then efficiently multiplied together. More specifically, compiler 122 determines that the data is i.i.d. and that it can optimize the inference code accordingly. In this case, each (x, y) of expression 620 contributes to the likelihood independently, and they can be evaluated in parallel. According to an embodiment, compiler 122 works in log-space, and thus performs summations. As such, compiler 122 generates parallelized inference code for the evaluation of $f$ from the IR expression 610, which inference code takes advantage of the parallelism of highly parallel data structures.

Despite the simplicity of this MH parallelization, the code scales reasonably well: there is a large amount of parallelism because it is roughly proportional to the number of data points; uncovering the parallelism in the code does not increase the overall quantity of computation that has to be performed; and the ratio of computation to global memory accesses is high enough to hide memory latency bottlenecks.

Generating Data-Parallel Gibbs Samplers

As a further example, a user instructs compiler 122 to use Gibbs inference to emit inference code to sample from a distribution in a provided model (such as the LDA model of specification 200). In this example, compiler 122 has access to information, at inference module 124B, about how to create Gibbs inference code for a provided model based on an IR that represents the model.

Compiler 122 compiles source code (such as specification 200) representing an LDA model, of a body of data, into an intermediate representation of the model, such as intermediate representation expression 700 of FIG. 7. Compiler 122 receives an instruction to create Gibbs inference code for the provided model, which causes compiler 122 to emit the requested Gibbs inference code (i.e., a Gibbs sampler).

To generate a Gibbs sampler from IR expression 700, compiler 122 analyzes how to sample from each univariate distribution represented in expression 700. As an example, to draw $\theta_m$ as part of the $(\tau+1)$th sample, compiler 122 generates code that samples from the distribution indicated in expression 700.

In order to uncover conjugacy relations and independence between variables based on the symbolic representation of the model (i.e., IR expression 700), compiler 122 implements an algebraic rewrite system that attempts to rewrite expression 700 in terms of expressions known to compiler 122 (i.e., the joint distribution of the entire model). This rewriting of the IR is at least part of the analysis that compiler 122 performs on the IR of a model in order to produce inference code to sample from one or more distributions specified in the model. Expressions 710 of FIG. 7 show a few selected rewrite rules (a)-(d) to give a flavor of a rewrite system according to an embodiment.

Rule (a) of expressions 710 states that like terms can be canceled. Rule (b) says that terms that do not depend on the variable of integration can be pulled out of the integral. Rule (c) says that it is possible to partition a product over N-terms into two products, one where a predicate q is satisfied on the indexing variable and one where it is not. Rule (d) is a combination of the product and sum rule.

According to an embodiment, one or more of the rewrite rules applied by the rewrite system of compiler 122 are supplied by the inference module of the inference algorithm being applied to the provided model (e.g., from inference module 124B). According to an embodiment, one or more of the rewrite rules applied by the rewrite system of compiler 122 are not specific to a particular inference algorithm, or in other words, are universally applied by compiler 122 to intermediate representations without regard to the inference algorithm being used to create the inference code. According to an embodiment, such universally-applied rewrite rules embody standard mathematical rules.

Furthermore, the rules used to rewrite an IR may include one or more rewrite rules that are specific to a class of a probability distribution specified by the model represented by the IR. A class of a probability distribution is identified based on one or more of: a type of one or more distributions represented in the model; a pattern present in the model; etc. According to an embodiment, compiler 122 applies such class-specific rules to an IR to analyze the parallelism in the represented model, or in other words, to identify independent variables in the IR.

Going back to the example of IR expression 700, compiler 122 rewrites IR expression 700 into transformed expression 720 (FIG. 7) using one or more rules that are specific to the Gibbs inference algorithm to be applied to the model. As such, expressions 700 and 720 are both symbolic representations of the same model.

From expression 720, compiler 122 extracts, using one or more IR analysis rules, the information needed to create inference code for the represented model, without creating a graphical representation for the model, since expression 720 is rewritten in order to make such information available to compiler 122. For example, based on one or more IR analysis rules, it is clear from expression 720 that each $\theta_1, \ldots, \theta_m$ is independent of the others after conditioning on the other random variables. As a result, they may all be sampled in parallel.

At each step, compiler 122 can test for a conjugacy relation. From the form of expression 720, compiler 122 recognizes (based on one or more of the IR analysis rules) that the $z_{mj}$ are drawn from a categorical distribution and $\theta_m$ is drawn from a Dirichlet, and can exploit the fact that these are conjugate distributions. The posterior distribution for $\theta_m$ is:

Dirichlet $(\alpha+c_m)$ where $c_m$ is a vector whose kth entry is the number of z associated with document m that were assigned topic k. Importantly, compiler 122 now knows that the drawing of each z must include a counting phase.

IR expression 730 (FIG. 7) illustrates a case of the $\phi$ variables. For compiler 122 to sample from the distribution represented in expression 730, compiler 122 transforms expression 730 into transformed expression 740 of FIG. 7 using one or more rewrite rules that are specific to the Gibbs inference algorithm. Further, compiler 122 simplifies expression 740 to transformed expression 750 of FIG. 7 using one or more rewrite rules for clustering models. Clustering model rewrite rules may be applied to expression 740 based on compiler 122 identifying one or more patterns in expression 740 that indicate that the represented model is a clustering model. In this manner, compiler 122 performs a domain-specific transformation (or rewrite) that allows compiler 122 to generate inference code for clustering models.

An IR analysis rule that compiler 122 takes advantage of to reach this conclusion identifies the fact that the z are distributed according to a categorical distribution and are used to index into the $\phi$ array. Therefore, they partition the set of words w into K disjoint sets $w_1 \uplus \ldots \uplus w_k$, one for each topic. More concretely, the probability of words drawn from topic k can be rewritten in partitioned form (using rule (c) of expressions 710) as expression 750 of FIG. 7.

Expression 750 expresses the intuition that once a word's topic is fixed, the word depends on only one of the $\phi_k$ distributions. In this form, compiler 122 recognizes, based on one or more IR analysis rules, that it should draw from:

Dirichlet$(\beta+c_k)$ where $c_k$ is the count of words assigned to topic k. In general, compiler 122 detects patterns like the pattern above when compiler 122 determines that samples drawn from categorical distributions are being used to index into arrays, which is an example of an IR analysis rule.

Finally, compiler 122 turns to analyzing the $z_{ij}$ based on one or more IR analysis rules. In this case, compiler 122 will again detect that they can be sampled in parallel but it will not be able to detect a conjugacy relationship. Compiler 122 will then detect that the $z_{ij}$ are drawn from discrete distributions, so that the univariate distribution can be calculated exactly and sampled from. In cases where the distributions are continuous, compiler 122 can try to use another approximate sampling method as a subroutine for drawing that variable.

If compiler 122 fails to find a conjugacy relation from the IR of a model, e.g., if the model has a complicated structure, the compiler 122 will use Metropolis-Hastings and therefore exploit the inherent parallelism of these algorithms.

According to an embodiment, the rewrite rules are applied deterministically and the process will always terminate and produce the same result. Overall, the cost of analysis is negligible compared to the sampling time for large data sets. Although the rewrite system is simple, it enables us to use a concise symbolic representation for the model and thereby scale to large networks.

At times, generation of Gibbs sampler inference code involves many random variables that have interdependencies. To generate parallelized code, compiler 122 finds random variables that are independent (which can be treated in parallel). The analysis (such as rewrite and application of IR analysis rules) of the mathematical formula of an IR identifies independence of variables, which reveals whether variables in the IR are actually dependent on one another. For example, prior to a rewrite of a particular IR, it appears from the IR that X is dependent on Y. However, based on a rewritten version of the particular IR, it becomes clear that Y is a constant. As such, X is not dependent on Y. Thus, X and Y can be treated in parallel.

Exploring a Model Using Multiple Inference Algorithms

According to an embodiment, a user provides compiler 122 with information identifying two or more inference algorithms, i.e., from inference modules 124A-N, on which to base two or more samplers for a provided model. For example, a user requests that compiler 122 produce both a Metropolis-Hastings sampler and a Gibbs sampler for a provided model. As a response to this request, compiler 122 produces both inference code for a Metropolis-Hastings sampler and inference code for a Gibbs sampler on the provided model. In this example, each set of inference code explores all dimensions, or all probability distributions, of the provided model with a single inference algorithm, MH and Gibbs, respectively.

According to another embodiment, the user requests a composite sampler that explores different dimensions of a particular model using different inference algorithms. A model is a product of N primitive distributions (Gaussian, Bernouilli, etc. . . . ). Dimensions of a model are the primitive distributions for the model. In this embodiment, compiler 122 produces inference code that explores at least one dimension, or probability distribution, of a provided model using a first inference algorithm and explores at least one other dimension, or probability distribution, of the provided model using a second (distinct) inference algorithm. For example, a user requests that compiler 122 produce a mixed Metropolis-Hastings, Slice, and Gibbs sampler (applied to various dimensions of a model) for a provided model, where the model includes at least three dimensions. In response to this request, compiler 122 produces inference code for a sampler in which a first dimension of the model is explored using Gibbs inference, a second dimension of the model is explored using Metropolis-Hastings inference, and a third dimension of the model is explored using Slice inference.

When compiler 122 produces one or more sets of inference code based on multiple inference algorithms, compiler 122 uses the rewrite rules from each indicated algorithm to rewrite the IR of the provided model into distinct algorithm-specific expressions that represent the model. For example, if both a Gibbs sampler and an MH sampler are requested, compiler 122 rewrites the IR of the provided model based, at least in part, on the rewrite rules for the Gibbs inference algorithm to produce a Gibbs-specific rewritten expression of the model. Compiler 122 produces the Gibbs inference code based, at least in part, on the Gibbs-specific rewritten expression of the model. Compiler 122 also rewrites the IR of the provided model based, at least in part, on the rewrite rules specific to the MH inference algorithm to produce an MH-specific rewritten expression of the model. Compiler 122 produces the MH inference code based, at least in part, on the MH-specific rewritten expression of the model.

Data-Parallel Operations on Distributions

To produce efficient parallel code, compiler 122 needs to uncover parallelism (as described above), and also pulls efficient routines for inference code from a library of data-parallel operations for distributions. The data-parallel operations for distributions in this library are optimized for implementation on a highly parallelized architecture. Thus, using the operations in this library allows compiler 122 to produce CUDA code to use a GPU effectively, i.e., using operations that are optimized for GPU execution.

For instance, in the case of LDA, there are two steps in which compiler 122 emits inference code that draws from many Dirichlet distributions in parallel. In the first case, when drawing the topic distributions for the documents, each thread can draw one of the $\theta_i$ by generating K Gamma variates and normalizing them. Since the number of documents is usually very large, this produces enough parallelism to make full use of the GPU's cores.

However, this will not produce sufficient parallelism when drawing the $\phi_k$, because the number of topics is usually small compared to the number of cores. Consequently, compiler 122 uses a different procedure (algorithm 800 of FIG. 8) to sample from K Dirichlet variates.

To generate K Dirichlet variates over V categories with concentration parameters $\alpha_{11}, \ldots, \alpha_{KV}$, compiler 122 emits inference code (e.g., based on a library function) that first generates a matrix A where $A_{ij} \sim \text{Gamma}(\alpha_{ij})$ and then normalizes each row of this matrix. For sampling the $\phi_i$, compiler 122 emits inference code that causes the launch of a thread to generate the gamma variates for each column (rather than for each row), and then separately computes a normalizing constant for each row by multiplying the matrix by an all-ones vector, e.g., using CUDA Basic Linear Algebra Subroutines (cuBLAS). Such an implementation is more effective than creating a thread for each row when the number of columns is larger than the number of rows. This is an instance where the two stage compilation procedure is useful, because compiler 122 is able to use information about the relative sizes of K and V to decide whether algorithm 800 will be more efficient than the simple scheme.

This sort of optimization is not unique to the Dirichlet distribution. For example, when generating a large number of multinormal variates by applying a linear transformation to a vector of normal variates, the strategy for extracting parallelism may change based on the number of variates to generate, the dimension of the multinormal, and the number of GPU cores.

Segmented Data-Parallel Operators

Furthermore, compiler 122 uses segmented data-parallel operators to produce efficient GPU inference code when ragged arrays are included in the specification of a model. Parallelization of ragged arrays can result in inefficient GPU code because of differences in the amounts of data in the various sub-arrays of a ragged array. To illustrate, if the processing of information in sub-arrays of a ragged array is assigned to cores of a GPU on a sub-array by sub-array basis, some of the cores will receive more work (i.e., longer sub-arrays) than others, leaving some GPU cores idle while others are still working. However, using segmented data-parallel operators, compiler 122 divides up the computation work needed to create the inference code based on a ragged array among the cores of a GPU without regard to the boundaries of the sub-arrays of the ragged array, which allows the work to be distributed more evenly among the GPU cores.

Because compiler 122 tries to parallelize operations over arrays, users can maximize the amount of parallelism in their models by structuring them so that data and parameters are stored in large, flattened arrays. In addition, as more options and inference strategies are added to the framework of compiler 122, users will be able to experiment with the tradeoffs of different inference algorithms in a way that would be too time-consuming to do manually.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
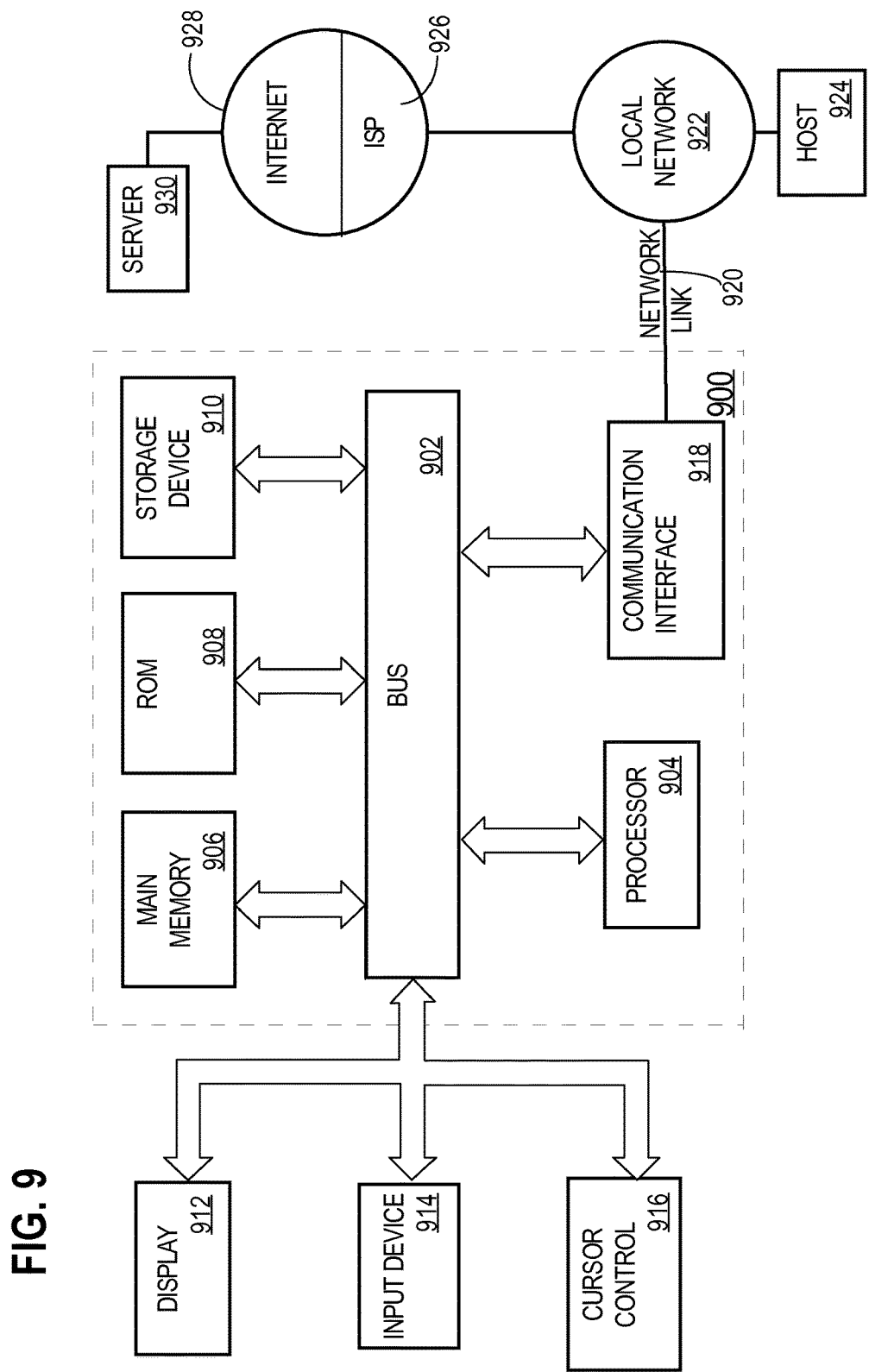
FIG. 9 is a block diagram of a computer system on which embodiments may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, xkillplane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Cloud Computing Overview

The techniques described herein are implemented using one or more processing solutions, examples of which include distributed systems, clustered computing systems, and cloud computing systems. In an embodiment, compiler 122 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to compiler 122, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

APPENDIX A

Augur: a Modeling Language for Data-Parallel Probabilistic Inference

Jean-Baptiste Tristan  
Oracle Labs  
JEAN.BAPTISTE.TRISTAN@ORACLE.COM

Daniel Huang  
Harvard University  
DEHUANG@FAS.HARVARD.EDU

Joseph Tassarotti  
Carnegie Mellon University  
JTASSARO@CS.CMU.EDU

Adam Pocock  
Oracle Labs  
ADAM.POCOCK@ORACLE.COM

Stephen J. Green  
Oracle Labs  
STEPHEN.X.GREEN@ORACLE.COM

Guy L. Steele, Jr  
Oracle Labs  
GUY.STEELE@ORACLE.COM

Abstract

It is time-consuming and error-prone to implement inference procedures for each new probabilistic model. Probabilistic programming addresses this problem by allowing a user to specify the model and having a compiler automatically generate an inference procedure for it. For this approach to be practical, it is important to generate inference code that has reasonable performance. In this paper, we present a probabilistic programming language and compiler for Bayesian networks designed to make effective use of data-parallel architectures such as GPUs. We show that the compiler can generate data-parallel inference code scalable to thousands of GPU cores by making use of the conditional independence relationships in the Bayesian network.

1. Introduction

Machine learning, and especially probabilistic modeling, can be difficult to apply. A user needs to not only design the model, but also implement the right inference procedure. There are many different inference algorithms, most of which are conceptually complicated and difficult to implement at scale. Despite the enthusiasm that many people who practice data analysis have for machine learning, this complexity is a barrier to deployment. Any effort to simplify the use of machine learning would thus be very useful.

Probabilistic programming (Goodman, 2013), as introduced in the BUGS project (Thomas et al., 1992), is a way to simplify the application of machine learning based on Bayesian inference. The key feature of probabilistic programming is separation of concerns: the user specifies *what* needs to be learned by describing a probabilistic model, while the compiler automatically generates the *how*, that is, the inference procedure. In particular, the programmer writes code that describes a probability distribution. Using a compiler-generated inference algorithm, the programmer then samples from this distribution.

However, doing inference on probabilistic programs is computationally intensive and challenging. As a result, developing algorithms to perform inference is an active area of research. These include deterministic approximations (such as variational methods) and Monte Carlo approximations (such as MCMC algorithms). The problem is that most of these algorithms are conceptually complicated, and it is not clear, especially for non-experts, which one would work best for a given model.

To address the performance issues, our work has been driven by two observations. The first observation is that good performance starts with an appropriate inference al-

*Copyright 2014 by the author(s).* gorithm, and selecting the right algorithm is often the hardest problem. For example, if our compiler only emits Metropolis-Hastings inference, there are models for which our programming language will be of no use, even given large amounts of computational power. We must design the compiler in such a way that we can include the latest research on inference while reusing pre-existing analyses and optimizations, or even mix inference techniques. Consequently, we have designed our compiler as a modular framework where one can add a new inference algorithm while reusing already implemented analyses and optimizations. For that purpose, our compiler uses an intermediate representation (IR) for probability distributions that serves as a target for modeling languages and as a basis for inference algorithms. We will show this IR is key to scaling the compiler and the inference to very large networks.

The second observation is if we wish to continue to benefit from advances in hardware we *must* focus on producing highly *parallel* inference algorithms. We claim that many MCMC inference algorithms are highly data-parallel (Hillis & Steele, 1986; Blelloch, 1996) within a single Markov Chain if we take advantage of the conditional independence relationships of the input model (e.g. the assumption of i.i.d. data makes the likelihood independent across data points). Moreover, we can automatically generate good data-parallel inference with a compiler. Such inference will run very efficiently on highly parallel architectures such as Graphics Processing Units (GPUs). It is important to note that parallelism brings an interesting trade-off for performance since some inference techniques can result in less parallelism and will not scale as well.

In this paper, we present our compilation framework, named *Augur*. To start (Section 2), we demonstrate how to specify two popular models in our language and use them to do learning and prediction. Then, (Section 3), we describe how we support different modeling languages by embedding them into Scala using Scala's macro system, which provides type checking and IDE support, and we describe the probabilistic IR. Next, (Section 4), we describe data-parallel versions of Metropolis-Hastings and Gibbs sampling that scale on the GPU and speed up sampling. Our compiler also includes a Metropolis-Within-Gibbs sampler but we do not detail these in this paper. Then (Section 5), we present the results of some benchmarks, which include comparisons against other implementations of inference for a regression, a Gaussian Mixture Model, and LDA. Finally (Section 6), we review the literature in probabilistic programming.

Our main results are: first, not only are some inference algorithms highly data-parallel and amenable to GPU execution, but a compiler can *automatically* generate such GPU implementations effectively; second, for the compiler to be

```
1  object LDA {
2  class sig(var phi : Array[Double],
3            var theta : Array[Double],
4            var z : Array[Int],
5            var w : Array[Int])
6
7  val model = bayes {
8    (K: Int, V: Int, M: Int, N: Array[Int]) => {
9    val alpha = vector(K,0.1)
10   val beta = vector(V,0.1)
11   val phi = Dirichlet(V,beta).sample(K)
12   val theta = Dirichlet(K,alpha).sample(M)
13   val w =
14     for(i <- 1 to M) yield {
15       for(j <- 1 to N(i)) yield {
16         val z: Int =
17           Categorical(K,theta(i)).sample()
18         Categorical(V,phi(z)).sample()
19       }}
20     observe(w)
21  }}}
```

Figure 1. Specification of the latent Dirichlet allocation model in Augur. The model specifies the probability distribution $p(\phi, \theta, z \mid w)$. The keyword bayes introduces the modeling language for Bayesian networks.

able to handle large model specifications (such as LDA) it is key to use a symbolic representation of the distribution rather than constructing the graphical model.

2. The Augur Language

As examples, we first present the specification of two models in Augur, Latent Dirichlet Allocation (LDA) (Blei et al., 2003) and multivariate regression. Then we show how the LDA model is used to learn the topics present in a set of documents. The supplementary material contains five examples of probabilistic models in Augur including a polynomial regression, a categorical and a Gaussian Mixture Model (GMM), a Naive Bayes classifier, and a Hidden Markov Model (HMM).

2.1. Specifying the Models

The LDA model specification is shown in Figure 1. The probability distribution is defined as a Scala object (object LDA) and is composed of two declarations. First, we declare the support of the probability distribution as a class that must be named sig. Here the support is composed of four arrays, with one each for the distribution of topics per document (theta), the distribution of words per topic (phi), the topics assigned to the words (z), and the words in the corpus (w). The support is used to store the inferred model parameters. These last two arrays are flat representations of ragged arrays, and so we do not require the documents to be of equal length.

The second declaration specifies the Bayesian network associated with LDA and makes use of our domain specific

```
1  object LinearRegression {
2  class sig(var w: Array[Double], var b: Double,
3             var tau: Double, var x: Array[Double],
4             var y: Array[Double])
5
6  val model = bayes {
7   (K: Int, N: Int, l: Double, u: Double) => {
8
9    val w = Gaussian(0, 10).sample(K)
10   val b = Gaussian(0, 10).sample()
11   val tau = InverseGamma(3.0, 1.0).sample()
12   val x = for(i <- 1 to N)
13        yield Uniform(l, u).sample(K)
14   val y = for (i <- 1 to N) yield {
15     val phi = for(j <- 1 to K) yield w(j) * x(i)(j)
16     Gaussian((phi.sum) + b, tau).sample()
17   }
18   observe(x, y)
19  }};
```

Figure 2. Specification of a multivariate regression in Augur.

language for Bayesian networks. The DSL is marked by the bayes keyword and delimited by the following enclosing brackets. The model first declares the parameters of the model: K for the number of topics, V for the vocabulary size, M for the number of documents, and N for the array that associates each document with its size.

In the model itself, we define the hyper-parameters (values alpha and beta) for the Dirichlet distributions and draw K Dirichlet samples of dimension V for the distribution of words per topic (phi) and M Dirichlet samples of dimension K for the distribution of topics per document (theta). Then, for each word in each document, we draw a topic z from theta, and finally a word from phi based on the topic we drew for z.

The regression model in Figure 2 is defined in the same way and uses similar language features. In this example the support comprises the (x,y) data points, the weights w, the bias b, and the noise tau. The model uses an additional sum function to sum across the feature vector.

2.2. Using the model

Once a model is specified, it can be used as any other Scala object by writing standard Scala code. For instance, one may want to use the LDA model with a training corpus to learn a distribution of words per topic and then use it to learn the per-document topic distribution of a test corpus. An implementation is presented in Figure 3. First the programmer must allocate the parameter arrays which contain the inferred values. Then the signature of the model is constructed which encapsulates the parameters. The LDA.model.map command returns the MAP estimate of the parameters given the observed words.

To test the model, a new signature is constructed containing the test documents, and the previously inferred phi values. Then LDA.model.map is called again, but with both the phis and the words observed (by supplying Set("phi")). The inferred thetas for the test documents are stored in s_test.theta.

3. A Modular Compilation Framework

Before we detail the architecture of our compiler, it is useful to understand how a model goes from a specification down to CUDA code running on the GPU. There are two distinct compilation phases. The first happens when the programmer compiles the program with scalac (assuming that the code from Figure 1 is in a file named LDA.scala)

scalac -classpath augur.jar LDA.scala

The file augur.jar is the package containing our compiler. The first phase of compilation happens statically, during normal scalac compilation. In this phase, the block of code following the bayes keyword is transformed into our intermediate representation for probability distributions. The second compilation phase happens at runtime, when the programmer calls the LDA.model.map method. At that point, the IR is transformed, analyzed, and optimized, and finally, CUDA code is emitted and run.

Our framework is therefore composed of two distinct components that communicate through the IR: the front end, where domain specific languages are converted into the IR, and the back end, where the IR can be compiled down to various inference algorithms (currently Metropolis-Hastings, Gibbs sampling, and Metropolis-Within-Gibbs). To define a modeling language in the front end, we make use of the Scala macro system. The macro system allows us to define a set of functions (called "macros") that will be executed by the Scala compiler on the code enclosed by the macro. We are currently focusing on Bayesian networks, but other DSLs (e.g., Markov random fields) could be added without modifications to the back end. The implementation of the macros to define the Bayesian network language is conceptually uninteresting so we omit further details. Our Bayesian network language is fairly standard, with the notable exception that it is *implicitly* parallel.

Separating the compilation into two distinct phases gives us many advantages. As our language is implemented using Scala's macro system it provides automatic syntax highlighting, method name completion and code refactoring in any IDE which supports Scala. This greatly improves the usability of the DSL as no special tools need to be developed to support it. This macro system allows Augur to use Scala's parser, semantic analyzer (e.g., to check that variables have been defined), and type checker. Also we benefit from the Scala compiler's optimizations such as constant folding and dead code elimination.

Augur: a Modeling Language for Data-Parallel Probabilistic Inference

```
1  val phi = new Array|Double|(k * v)
2  val theta_train = new Array[Double](doc_num_train * k)
3  val z_train = new Array(num_tokens_train)
4  val s_train = new LDA.sig(phi, theta_train, z_train, w_train)
5  LDA.model.map(Set(), (k, v, doc_num_train, docs_length_train), s_train, samples_num, Infer.GIBBS)
6
7  val z_test = new Array(num_tokens_test)
8  val theta_test = new Array|Double|(doc_num_test * k)
9  val s_test = new LDA.sig(phi, theta_test, z_test, w_test)
10 LDA.model.map(Set("phi"), (k, v, doc_num_test, docs_length_test), s_test, samples_num, Infer.GIBBS)
```

*Figure 3.* Example use of the LDA. Function `LDA.model.map` returns a maximum a posteriori estimation. It takes as arguments the set of variables to observe (on top of the ones declared as observed in the model specification), the hyperparameters, the initial parameters, the output parameters, the number of iterations and the inference to use. The parameters are stored in `LDA.sig`.

Then, because the IR is compiled to CUDA code *at runtime*, we know the values of all the hyper-parameters and the size of the dataset. This enables better optimization strategies, and also gives us key insights into how to extract parallelism (Section 4.2). For example, when compiling LDA, we know that the number of topics is much smaller than the number of documents and thus parallelizing over documents will produce more parallelism than parallelizing over topics.

Finally, we also provide a library which defines standard distributions such as Gaussian, Dirichlet, etc. In addition to these standard distributions, each model denotes its own user-defined distribution. All of these distributions are subtypes of the `Dist` supertype. Currently, the `Dist` interface provides two methods: `map`, which implements maximum a posteriori estimation, and `sample`, which returns a sequence of samples.

4. Generation of Data-Parallel Inference

When an inference procedure is invoked on a model (e.g. `LDA.model.map`), the IR is compiled down to CUDA inference code for that model. Informally, our IR expressions are generated from this Backus-Naur form grammar:

$$P ::= p(\vec{X}) \mid p(\vec{X} \mid \vec{X}) \mid PP \mid \frac{1}{P}$$

$$\mid \prod_i^N P \mid \int_X P \, dx \mid \{P\}_c$$

The goal of the IR is to make the sources of parallelism in the model more explicit and to support analysis of the probability distributions present in the model. For example, a $\prod$ indicates that each sub-term can be evaluated in parallel.

The use of such a symbolic representation for the model is key to scale to large networks. Indeed, as we will show in the experimental evaluation (Section 5), popular probabilistic programming language implementations such as `JAGS` or `Stan` reify the graphical model, resulting in unreasonable memory consumption for models such as LDA.

A consequence of our symbolic representation is that it becomes more difficult to discover conjugacy relationships, a point we will come back to.

In the rest of this section, we explain how the compiler generates data-parallel samplers that exploit the conditional independence structure of the model. We will use our two examples to explain how the compiler analyzes the model and generates the inference code.

4.1. Generating data-parallel MH samplers

If the user wants to use Metropolis-Hastings inference on a model, the compiler needs to emit code for a function $f$ that is proportional to the distribution the user wants to sample from. This function is then linked with our library implementation of Metropolis-Hastings. The function $f$ is composed of the product of the prior and the likelihood of the model and is extracted automatically from the model specification. For example, applied to our regression example, $f$ is defined as $$f(\mathbf{x}, \mathbf{y}, \tau, b, \mathbf{w}) = p(b)p(\tau)p(\mathbf{w})p(\mathbf{x})p(\mathbf{y}|\mathbf{x}, b, \tau, \mathbf{w})$$

which is equal to (and represented in our IR as)

$$p(b)p(\tau) \left( \prod_k^K p(w_k) \right) \left( \prod_n^N p(x_n)p(y_n|\mathbf{x_n} \cdot \mathbf{w} + b, \tau) \right)$$

In this form, the compiler knows that the distribution factorizes into a large number of terms that can be evaluated in parallel and then efficiently multiplied together; more specifically, it knows that the data is i.i.d. and that it can optimize accordingly. In this case, each $(x, y)$ contributes to the likelihood independently, and they can be evaluated in parallel. In practice, we work in log-space, so we perform summations. The compiler can then generate the CUDA code for the evaluation of $f$ from the IR representation. This code generation step is conceptually simple and we will not explain it further.

It is interesting to note that despite the simplicity of this parallelization the code scales reasonably well: there is a large amount of parallelism because it is roughly proportional to the number of data points; uncovering the parallelism in the code does not increase the overall quantity of computation that has to be performed; and the ratio of computation to global memory accesses is high enough to hide memory latency bottlenecks.

4.2. Generating data-parallel Gibbs samplers

Alternatively, and more interestingly, the compiler can generate a Gibbs sampler for some models. For instance, we would like to generate a Gibbs sampler for LDA, as a simple Metropolis-Hastings sampler will have a very low acceptance ratio. Currently we cannot generate a collapsed or blocked sampler, but there is interesting work related to dynamically collapsing or blocking variables (Venugopal & Gogate, 2013), and we leave it to future work to extend our compiler with this capability.

To generate a Gibbs sampler, the compiler needs to Figure out how to sample from each univariate distribution. As an example, to draw $\theta_m$ as part of the $(\tau+1)$th sample, the compiler needs to generate code that samples from the following distribution $$p(\theta_m^{\tau+1}|w^{\tau+1}, z^{\tau+1}, \theta_1^{\tau+1}, ..., \theta_{m-1}^{\tau+1}, \theta_{m+1}^{\tau}, ..., \theta_M^{\tau})$$

As we previously explained, our compiler uses a symbolic representation of the model: the upside is that it makes it possible to scale to large networks, but the downside is that it becomes more challenging to uncover conjugacy relations and independence between variables. To accomplish this, the compiler implements an algebraic rewrite system that attempts to rewrite the above expression in terms of expressions it knows (i.e., the joint distribution of the entire model). We show a few selected rules below to give a flavor of the rewrite system.

(a) $\frac{P}{P} \Rightarrow 1$ (b) $\int P(x) Q \, dx \Rightarrow Q \int P(x) dx$ (c) $\prod_i^N P(x_i) \Rightarrow \prod_i^N \{P(x_i)\}_{q(i)=true} \prod_i^N \{P(x_i)\}_{q(i)=false}$ (d) $P(x) \Rightarrow \frac{P(x,y)}{\int P(x,y) \, dy}$ Rule (a) states that like terms can be canceled. Rule (b) says that terms that do not depend on the variable of integration can be pulled out of the integral. Rule (c) says that we can partition a product over N-terms into two products, one where a predicate $q$ is satisfied on the indexing variable and one where it is not. Rule (d) is a combination of the product and sum rule. Currently, the rewrite system is just comprised of rules we found useful in practice, and it is easy to extend the system to add more rewrite rules.

Going back to our example, the compiler rewrites the desired expression into the one below:

$$\frac{p(\theta_m^{\tau-1}) \prod_j^{N(m)} p(z_{mj}|\theta_m^{\tau+1})}{\int p(\theta_m^{\tau+1}) \prod_j^{N(m)} p(z_{mj}|\theta_m^{\tau+1}) d\theta_m^{\tau+1}}$$

In this form, it is clear that each $\theta_1, \ldots, \theta_m$ is independent of the others after conditioning on the other random variables. As a result, they may all be sampled in parallel.

At each step, the compiler can test for a conjugacy relation. In the above form, the compiler recognizes that the $z_{mj}$ are drawn from a categorical distribution and $\theta_m$ is drawn from a Dirichlet, and can exploit the fact that these are conjugate distributions. The posterior distribution for $\theta_m$ is:

$$\texttt{Dirichlet}(\alpha + c_m)$$

where $c_m$ is a vector whose $k$th entry is the number of $z$ associated with document $m$ that were assigned topic $k$. Importantly, the compiler now knows that the drawing of each $z$ must include a counting phase.

The case of the $\phi$ variables is more interesting. In this case, we want to sample from $$p(\phi_k^{\tau+1}|w^{\tau+1}, z^{\tau+1}, \theta^{\tau+1}, \phi_1^{\tau+1}, ..., \phi_{k-1}^{\tau+1}, \phi_{k+1}^{\tau}, ..., \phi_K^{\tau})$$

After the application of the rewrite system to this expression, the compiler discovers that this is equal to $$\frac{p(\phi_k) \prod_i^M \prod_j^{N(i)} \{p(w_i|\phi_{z_{ij}})\}_{k=z_{ij}}}{\int p(\phi_k) \prod_i^M \prod_j^{N(i)} \{p(w_i|\phi_{z_{ij}})\}_{k=z_{ij}} d\phi_k}$$

The key observation that the compiler takes advantage of to reach this conclusion is the fact that the $z$ are distributed according to a categorical distribution and are used to index into the $\phi$ array. Therefore, they partition the set of words $w$ into $K$ disjoint sets $w_1 \uplus ... \uplus w_k$, one for each topic. More concretely, the probability of words drawn from topic $k$ can be rewritten in partitioned form using rule (c) as $$\prod_i^M \prod_j^{N(i)} \{p(w_{ij}|\phi_{z_{ij}})\}_{k=z_{ij}}$$

This expresses the intuition that once a word's topic is fixed, the word depends on only one of the $\phi_k$ distributions. In this form, the compiler recognizes that it should draw from $$\texttt{Dirichlet}(\beta + c_k)$$

where $c_k$ is the count of words assigned to topic $k$. In general, the compiler detects patterns like the above when it notices that samples drawn from categorical distributions are being used to index into arrays.

Finally, the compiler turns to analyzing the $z_{ij}$. In this case, it will again detect that they can be sampled in parallel but it will not be able to detect a conjugacy relationship. It will then detect that the $z_{ij}$ are drawn from discrete distributions, so that the univariate distribution can be calculated exactly and sampled from. In cases where the distributions are continuous, it can try to use another approximate sampling method as a subroutine for drawing that variable.

One concern with such a rewrite system is that it may fail to find a conjugacy relation if the model has a complicated structure. So far we have found our rewrite system to be robust and it can find all the usual conjugacy relations for models such as LDA, Gaussian Mixture Models or Hidden Markov Models, but it suffers from the same shortcomings as implementations of BUGS when deeper mathematics are required to discover a conjugacy relation (as would be the case for instance for a non-linear regression). In the cases where a conjugacy relation cannot be found, the compiler will (like BUGS) resort to using Metropolis-Hastings and therefore exploit the inherent parallelism of these algorithms.

Finally, note that the rewrite rules are applied deterministically and the process will always terminate and produce the same result. Overall, the cost of analysis is negligible compared to the sampling time for large data sets. Although the rewrite system is simple, it enables us to use a concise symbolic representation for the model and thereby scale to large networks.

4.3. Data-parallel Operations on Distributions

To produce efficient parallel code, the compiler needs to uncover parallelism, but we also need to rely on a good library of data-parallel operations for distributions. For instance, in the case of LDA, there are two steps in which we need to draw from many Dirichlet distributions in parallel. In the first case, when drawing the topic distributions for the documents, each thread can draw one of the $\theta_i$ by generating $K$ Gamma variates and normalizing them (Marsaglia & Tsang, 2000). Since the number of documents is usually very large, this produces enough parallelism to make full use of the GPU's cores.

However, this will not produce sufficient parallelism when drawing the $\phi_k$, because the number of topics is usually small compared to the number of cores. Consequently, we use a different procedure (Algorithm 1). To generate $K$ Dirichlet variates over $V$ categories with concentration parameters $\alpha_{11}, \ldots, \alpha_{KV}$, we first need to generate a matrix $A$ where $A_{ij} \sim \text{Gamma}(\alpha_{ij})$ and then normalize each row of this matrix. For sampling the $\theta_i$, we were effectively

---

Algorithm 1 Sampling from K Dirichlet Variates
Input: matrix $a$ of size $k$ by $n$
for $i = 0$ to $n - 1$ in parallel do
　　for $j = 0$ to $k - 1$ do
　　　　$v[i, j] \sim \text{Gamma}(a[i, j])$
　　end for
　　$v \times \vec{1}$
end for
Output: matrix $v$

--- launching a thread for each row. Now that the number of columns is much larger than the number of rows, we launch a thread to generate the gamma variates for each column, and then separately compute a normalizing constant for each row by multipying the matrix by an all-ones vector using CUBLAS. This is an instance where the two-stage compilation procedure (Section 3) is useful, because the compiler is able to use information about the relative sizes of $K$ and $V$ to decide that Algorithm 1 will be more efficient than the simple scheme.

This sort of optimization is not unique to the Dirichlet distribution. For example, when generating a large number of multinormal variates by applying a linear transformation to a vector of normal variates, the strategy for extracting parallelism may change based on the number of variates to generate, the dimension of the multinormal, and the number of GPU cores. We found that to use the GPU effectively we had to develop the language in concert with the creation of a library of data-parallel operations on distributions.

4.4. Parallelism & Inference Tradeoffs

It is difficult to give a cost model for Augur programs. Traditional approaches are not necessarily appropriate for probabilistic programs because there are tradeoffs between faster sampling times and convergence which are not easy to characterize. In particular, different inference methods may affect the amount of parallelism that can be exploited in a model. For example, in the case of multivariate regression, we can use the Metropolis-Hastings sampler presented above, which lets us sample from all the weights in parallel. However, we may be better off generating a Metropolis-Within-Gibbs sampler where the weights are sampled one at a time. This reduces the amount of exploitable parallelism, but it may converge faster, and there may still be enough parallelism in each step of Metropolis-Hastings by evaluating the likelihood in parallel.

In the Hidden-Markov model, once again, one may try to sample the state of the Markov chain in parallel using a Metropolis-Hastings sampler just for these variables. If the HMM is small this may be a good way to make use of a GPU. Of course, for a large HMM it will be more effective to sample the states of the Markov chain in sequence, and in this case there is less parallelism to exploit.

In each of these cases, it is not clear which of these alternatives is better, and different models may perform best with different settings. Despite these difficulties, because Augur tries to parallelize operations over arrays, users can maximize the amount of parallelism in their models by structuring them so that data and parameters are stored in large, flattened arrays. In addition, as more options and inference strategies are added to Augur, users will be able to experiment with the tradeoffs of different inference methods in a way that would be too time-consuming to do manually.

5. Experimental Study

To assess the runtime performance of the inference code generated by Augur, we present the results of benchmarks for the two examples presented throughout the paper and for a Gaussian Mixture Model (GMM). More detailed information on the experiments can be found in the supplementary material.

For the multivariate regression and GMM, we compare Augur's performance to those of two popular languages for statistical modeling, JAGS (Plummer, 2003) and Stan (Hoffman & Gelman, In press). JAGS is an implementation of the BUGS language, and performs inference using Gibbs sampling, adaptative Metropolis-Hastings, and slice sampling. Stan uses No-U-Turn sampling, a variant of Hamiltonian Monte Carlo sampling. In the regression experiment, we configured Augur to use Metropolis-Hastings[1], while for the GMM experiments Augur generated a Gibbs sampler.

In addition to JAGS and Stan, for the LDA benchmarks we also compare Augur to a handwritten CUDA implementation of a Gibbs sampler and a Scala implementation of a collapsed Gibbs sampler (Griffiths & Steyvers, 2004) from the Factorie library (McCallum et al., 2009). The former gives us a reference comparison for what might be possible for a manually optimized GPU implementation, while the latter gives a baseline for a Scala implementation that does not use GPUs.

5.1. Experimental Setup

For the linear regression experiment, we used data sets from the UCI regression repository (Bache & Lichman, 2013). The Gaussian Mixture Model experiments used two synthetic data sets, one generated from 3 clusters, the other from 4 clusters. For the LDA benchmark, we used a corpus extracted from the simple English variant of Wikipedia, with standard stopwords removed. This gives a corpus with 48556 documents, a vocabulary size of 37276 words, and approximately 3.3 million tokens. From that we sampled 1000 documents to use as a test set, removing words which appear only in the test set. To evaluate the model fit we use the log predictive probability measure (Hoffman et al., 2013) on the test set.

All experiments were run on a single workstation with an Intel Core i7 3770 @3.4GHz CPU, 32 GB RAM, a Samsung 840 SSD, and an NVIDIA Geforce Titan. The Titan runs on the Kepler architecture. All probability values are calculated in double precision. The CPU performance results using Factorie are calculated using a single thread, as the multi-threaded samplers are neither stable nor performant in the tested release. The GPU results use all 896 double-precision ALU cores available in the Titan[2].

5.2. Results

In general, our results show that once the problem is large enough we can amortize Augur's startup cost of model compilation to CUDA, nvcc compilation to a GPU binary, and copying the data to and from the GPU. This cost is approximately 10 seconds on average across all our experiments. After this point Augur scales to larger numbers of samples in shorter runtimes than comparable systems. More experimental detail is in the supplementary material.

Our experiments with regression show that Augur's inference is similar to JAGS in runtime and performance, and better than Stan. This is not a surprise because the regressions have few random variables and the data sets are relatively small, and so making use of the GPU is not justified (except maybe for much larger data sets). However, the results are very different for models with latent variables where the number of variables grows with the data set.

For instance, using the GMM example, we show (Figure 8) that Augur scales better than JAGS and Stan. For a hundred thousand data points, Augur draws a thousand samples in about 3 minutes whereas JAGS needs more than 21 minutes and Stan requires more than 6 hours. Each system found the correct means and variances for the clusters, the aim here is to measure the scaling of runtime with problem size.

Results from the LDA experiment are presented in Figure 5 and use predictive probability to compare convergence over time. We compute the predictive probability and record the

---

[1] A better way to do inference in the case of the regression would have been for Augur to produce a Gibbs sampler, but this is not currently implemented. The conjugacy relation for the weights is not just an application of conjugacy rules (Neal, 2013). We could add specific rules for linear regressions (which is what JAGS does). However, we leave it for future work to make the compiler user extensible.

[2] The Titan has 2688 single-precision ALU cores, but single precision resulted in poor quality inference results, though the speed was greatly improved.

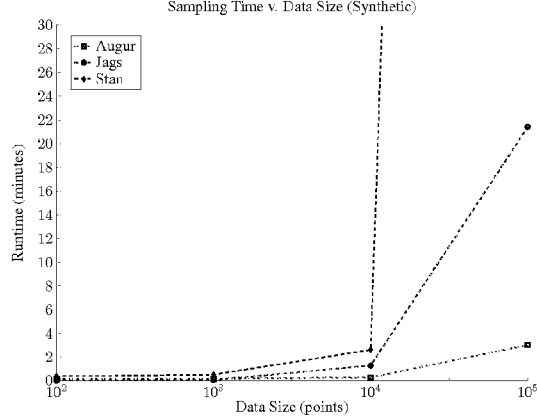

Figure 4. Evolution of runtime to draw a thousand samples for varying data set sizes for a Gaussian Mixture Model. Stan's last data point is cropped, it took 380 minutes.

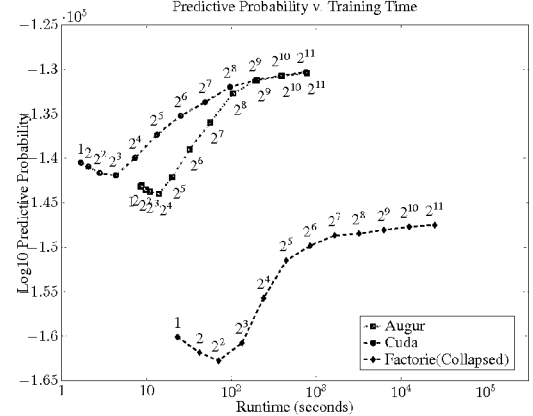

Figure 5. Evolution of the predictive probability over time for up to 2048 samples and for three implementations of LDA inference: Augur, hand-written CUDA, Factorie's Collapsed Gibbs.

time after drawing $2^i$ samples, for $i$ ranging from 0 to 11 inclusive. The time is reported in seconds. It takes Augur 8.1 seconds to draw its first sample for LDA. The inference for Augur is very close to that of the hand-written CUDA implementation, and much faster than the Factorie collapsed Gibbs sampler. Indeed, it takes 6.7 more hours for the collapsed LDA implementation to draw 2048 samples than it does for Augur.

We also implemented LDA in the JAGS and Stan systems but they run into scalability issues. The Stan version of LDA uses 55 gigabytes of RAM but failed to draw a second sample given a week of computation time. Unfortunately, we could not apply JAGS because it requires more than 128 gigabytes of memory. In comparison, Augur uses less than a gigabyte of memory for this experiment.

6. Related Work

To our knowledge, BUGS (Lunn et al., 2009) was the first probabilistic programming language. Interestingly, most of the key concepts of probabilistic programming already appeared in the first paper to introduce BUGS (Thomas et al., 1992). Since then, research in probabilistic programming languages has been focused in two directions: improving performance and scalability through better inference generation; and, increasing expressiveness and building the foundations of a universal probabilistic programming language. These two directions are useful criteria to compare probabilistic programming languages.

In terms of language expressiveness, Augur is currently limited to the specification of Bayesian networks. It is possible to extend this language (e.g., non-parametric models) or to add new modeling languages (e.g., Markov random field), but our current focus is on improving the inference generation. That is in contrast with languages like Hansei (Kiselyov & Shan, 2009), Odds (Stucki et al., 2013), Stochastic Lisp (Koller et al., 1997) and Ibal (Pfeffer, 2007) which focus on increasing expressiveness, at the expense of performance. However, as Augur is embedded in the Scala programming language, we have access to the wide variety of libraries on the JVM platform and benefit from Scala tools. Augur, like Stan (Hoffman & Gelman, In press) and BUGS (Thomas et al., 1992; Lunn et al., 2009) is a domain specific probabilistic language for Bayesian networks, but it is embedded in such a way that it has a very good integration with the rest of Scala, which is crucial to software projects where data analysis is only one component of a larger artifact.

Augur is not the only system designed for scalability and performance. It is also the case of Dimple (Hershey et al., 2012), Factorie (McCallum et al., 2009), Infer.net (Minka et al., 2012) and Figaro (Pfeffer, 2012; 2009), and the latest versions of Church (Goodman et al., 2008). Dimple focuses on performance using specialized inference hardware, though it does provide an interface for CPU code. Factorie mainly focuses on undirected networks, and is a Scala library rather than a DSL (unlike all the other systems mentioned). It has multiple inference backends, and aims to be a general purpose machine learning package. Infer.net is the system most similar to Augur, in that it has a two phase compilation approach, though it is based around variational methods. A block Gibbs sampler exists but is only functional on a subset of the models. Figaro focuses on a different set of inference techniques, including techniques which use exact inference in discrete spaces (they also have Metropolis-Hastings inference). Church provides the ability to mix different inference algorithms and has some parallel capability, but it is focused on task-parallelism for multicores rather than on data-parallelism for parallel architectures. GraphLab (Low et al., 2010) is another framework for parallel machine learning which is more focused on multiprocessor and distributed computing than on the kind of data-parallelism available on GPUs. The key difference between Augur and these other languages is the systematic generation of data-parallel algorithms for large numbers of cores (i.e., thousands) on generally available GPU hardware, and the use of a symbolic representation of the model in the compiler.

7. Conclusion

We find that it is possible to *automatically* generate parallel MCMC-based inference algorithms, and it is also possible to extract sufficient parallelism to saturate a modern GPU with thousands of cores. Our compiler achieves this with no extra information beyond that which is normally encoded in a graphical model description and uses a symbolic representation that allows scaling to large models (particularly for latent variable models such as LDA). It also makes it easy to run different inference algorithms and evaluate the tradeoffs between convergence and sampling time. The generated inference code is competitive in terms of sample quality with other probabilistic programming systems, and for large problems generates samples much more quickly.

References

Bache, K. and Lichman, M. UCI machine learning repository, 2013. URL http://archive.ics.uci.edu/ml.

Blei, David M., Ng, Andrew Y., and Jordan, Michael I. Latent dirichlet allocation. *Journal of Machine Learning Research*, 3:993–1022, 2003.

Blelloch, G. E. Programming parallel algorithms. *Communications of the ACM*, 39:85–97, 1996.

Goodman, N. D. The principles and practice of probabilistic programming. In *Proceedings of the 40th annual ACM SIGPLAN-SIGACT Symposium on Principles of Programming Languages*, POPL '13, pp. 399–402. ACM, 2013.

Goodman, N. D., Mansinghka, V. K., Roy, D., Bonawitz, K., and Tenenbaum, J. B. Church: A language for generative models. In *Proceedings of the 24th Conference on Uncertainty in Artificial Intelligence, UAI 2008*, pp. 220–229, 2008.

Griffiths, T. L. and Steyvers, M. Finding scientific topics. In *Proceedings of the National Academy of Sciences of the United States of America*, volume 101, 2004.

Hershey, S., Bernstein, J., Bradley, B., Schweitzer, A., Stein, N., Weber, T., and Vigoda, B. Accelerating inference: Towards a full language, compiler and hardware stack. *CoRR*, abs/1212.2991, 2012.

Hillis, W. D. and Steele, Jr., G. L. Data parallel algorithms. *Communications of the ACM*, 29(12):1170–1183, 1986.

Hoffman, M., Blei, D., Wang, C., and Paisley, J. Stochastic variational inference. *Journal of Machine Learning Research*, 14:1303–1347, 2013.

Hoffman, M. D. and Gelman, A. The no-U-turn sampler: Adaptively setting path lengths in Hamiltonian Monte Carlo. *Journal of Machine Learning Research*, In press.

Kiselyov, O. and Shan, C.-C. Embedded probabilistic programming. In *Proceedings of the IFIP TC 2 Working Conference on Domain-Specific Languages*, DSL '09, pp. 360–384. Springer-Verlag, 2009.

Koller, D., McAllester, D., and Pfeffer, A. Effective bayesian inference for stochastic programs. In *Proceedings of the 14th National Conference on Artificial Intelligence (AAAI)*, pp. 740–747, 1997.

Kruschke, John. *Doing Bayesian Data Analysis: A Tutorial Introduction with R*. Academic Press, 2010.

Low, Yucheng, Gonzalez, Joseph, Kyrola, Aapo, Bickson, Danny, Guestrin, Carlos, and Hellerstein, Joseph M. Graphlab: A new framework for parallel machine learning. *CoRR*, abs/1006.4990, 2010.

Lunn, D., Spiegelhalter, D., Thomas, A., and Best, N. The BUGS project: Evolution, critique and future directions. *Statistics in Medicine*, 2009.

Marsaglia, G. and Tsang, W. W. A simple method for generating gamma variables. *ACM Trans. Math. Softw.*, 26 (3):363–372, 2000.

McCallum, A., Schultz, K., and Singh, S. Factorie: Probabilistic programming via imperatively defined factor graphs. In *Advances in Neural Information Processing Systems 22*, pp. 1249–1257, 2009.

Minka, T., Winn, J.M., Guiver, J.P., and Knowles, D.A. Infer.NET 2.5, 2012. URL http://research.microsoft.com/infernet. Microsoft Research Cambridge.

Neal, Radford. CSC 2541: Bayesian methods for machine learning, 2013. Lecture 3.

Pfeffer, A. The Design and Implementation of IBAL: A General-Purpose Probabilistic Language. *Introduction to Statistical Relational Learning*, pp. 399–433, 2007.

Pfeffer, A. Figaro: An object-oriented probabilistic programming language. Technical report, Charles River Analytics, 2009.

Pfeffer, A. Creating and manipulating probabilistic programs with figaro. In *2nd International Workshop on Statistical Relational AI*, 2012.

Plummer, Martyn. Jags: A program for analysis of bayesian graphical models using gibbs sampling. In *Proceedings of the 3rd International Workshop on Distributed Statistical Computing (DSC 2003)*. March, pp. 20–22, 2003.

Stucki, S., Amin, N., Jonnalageda, M., and Rompf, T. What are the Odds? Probabilistic programming in Scala. In *Scala '13*, pp. 360–384. Springer-Verlag, 2013.

Thomas, A., Spiegelhalter, D. J., and Gilks, W. R. BUGS: a program to perform Bayesian inference using Gibbs sampling. *Bayesian Statistics*, 4:837 – 842, 1992.

Venugopal, D. and Gogate, V. Dynamic blocking and collapsing for gibbs sampling. In *29th Conference on Uncertainty in Artificial Intelligence*, UAI'13, 2013.

Yao, L., Mimno, D., and McCallum, A. Efficient methods for topic model inference on streaming document collections. In *Proceedings of the 15th ACM SIGKDD International Conference on Knowledge Discovery and Data Mining*, KDD '09, pp. 937–946. ACM, 2009.

A. Examples of Model Specification

We present a few examples of model specifications in Augur, covering three important topics in machine learning: regression (A.1), clustering (A.2, A.3, A.5), and classification (A.4). Our goal is to show how a few popular models can be programmed in Augur. For each of these examples, we first describe the support of the model, and then sketch the generative process, relating the most complex parts of the program to their usual mathematical notation.

A.1. Univariate polynomial regression

Our first example model is for univariate polynomial regression (Figure 6). The model's support is composed of the array w for the weights of each mononomial, x for the domain data points and y for their image. The parameters of the model are: N, the dataset size and M, the order of the polynomial. For simplicity, this example assumes that the domain of x ranges from 0 to 2.

The generative process is: We first independently draw each of the M weights, $w_i \sim N(0,1)$, then draw $(x,y)$ as follows:

$$x_j \sim \text{Uniform}(0,2) \qquad (1)$$

$$y_j \sim N(\sum_i^M w_i x_j^i, 1). \qquad (2)$$

For simplicity, the model is presented with many "hardwired" parameters, but it is possible to parameterize the model to control the noise level, or the domain of x.

A.2. Categorical mixture

The third example is a categorical mixture model (Figure 7). The model's support is composed of an array z for the cluster selection, x for the data points that we draw, theta for the priors of the categorical that represents the data, and phi for the prior of the indicator variable. The parameters of the model are: N data size, K number of clusters, and V for the vocabulary size.

The generative process is: For each of the N data points we want to draw, we select a cluster z according to their distribution phi and then draw from the categorical with distribution given by theta(z).

A.3. Gaussian Mixture Model

The fourth example is a univariate Gaussian mixture model (Figure 8). The model's support is composed of an array z for the cluster selection, x for the data points that we draw, mu for the priors over the cluster means, sigma for the priors of the cluster variances, and phi for the prior of the indicator variable. The parameters of the model are: N data size, K number of clusters.

The generative process is: For each of the N data points we want to draw, we select a cluster z according to their distribution pi and then draw from the Gaussian centered at mu(z) and of standard deviation sigma(z).

A.4. Naive bayes classifier

The fifth example is a binary naive Bayes classifier (Figure 9). The support is composed of an array c for the class and an array f for the features, pC the prior on the positive class, and pFgivenC an array for the probability of each binary feature given the class. The hyperparameters of the model are: N the number of data points, K the number of features and. The features form a 2-dimensional matrix but again the user has to "flatten" the matrix into an array.

The generative process is: First we draw the probability of an event being in one class or the other as pC. We use pC has the parameter to decide for each event in which class it falls (c). Then, for each feature, we draw the probability of Augur: a Modeling Language for Data-Parallel Probabilistic Inference

```
1  object UnivariatePolynomialRegression {
2
3    import scala.math._
4
5    class sig(var w: Array[Double], var x: Array[Double], var y: Array[Double])
6
7    val model = bayes {
8      (N: Int, M: Int) => {
9
10       val w = Gaussian(0,1).sample(M)
11       val x = Uniform(0,2).sample(N)
12       val bias = Gaussian(0,1).sample
13       val y = for(i <- 1 to N) {
14         val monomials = for (j <- 1 to M) yield { w(j) * pow(x(i),j) }
15         Gaussian((monomials.sum) + bias, 1).sample()
16       }
17
18       observe(x, y)
19     }
20   }
21 }
```

Figure 6. Specification of a univariate polynomial regression

```
1  object CategoricalMixture {
2    class sig(var z: Array[Int], var x: Array[Int], var theta: Array[Double], var phi: Array[Double])
3    val model = bayes {
4      (N: Int, K: Int, V: Int) => {
5
6      val alpha = vector(V,0.5)
7      val beta = vector(K,0.5)
8
9      val theta = Dirichlet(V,alpha).sample(K)
10     val phi = Dirichlet(K,beta).sample()
11
12     val x = for(i <- 1 to N) {
13        val z = Categorical(K, phi).sample()
14        Categorical(N,theta(z)).sample()
15     }
16     observe(x)
17   }
18  }
19 }
```

Figure 7. Specification of a categorical mixture model

```
1  object GaussianMixture {
2
3    class sig(var z: Array[Int], var x: Array[Double], var mu: Array[Double], var sigma: Array[Double], var phi: Array[Double])
4
5    val model = bayes {
6      (N: Int, K: Int, V: Int) => {
7
8      val alpha = vector(V,0.1)
9
10     val phi = Dirichlet(V,alpha).sample()
11     val mu = Gaussian(0,10).sample(K)
12     val sigma = InverseGamma(1,1).sample(K)
13
14     val x = for(i <- 1 to N) {
15        val z = Categorical(K, phi).sample()
16        Gaussian(mu(z), sigma(z)).sample()
17     }
18
19     observe(x)
20    }
21   }
22 }
```

Figure 8. Specification of a Gaussian mixture model

Algorithm 2 Sampling from Dirichlet($\alpha$) M times

Input: array $\alpha$ of size $n$
for M documents in parallel do
  for $i = 0$ to $n - 1$ do
    $v[i] \sim \text{Gamma}(a[i])$
  end for
  $s = \sum_{0}^{n-1} a[i]$ in parallel
  for $i = 0$ to $n - 1$ in parallel do
    $v[i] = \frac{v\,i}{s}$
  end for
end for
Output: array $v$ the feature occurring, pFgivenC, depending on whether the event is in the class or not. Finally, we draw the features f for each event.

A.5. Hidden Markov Model

The sixth example is a hidden Markov model (Figure 10) where the observation are the result of coin flips. The support is composed of the result of the coin flips flips, the priors for each of the coins bias, the transition matrix to decide how to change coin transition_matrix, and the states of the Markov chain that indicates which coin is being used for the flip MC_states. The two parameters of the model are the size of the data N, and the number of coins being used number_states.

The generative process is: draw a transition matrix for the Markov chain, a bias for each of the coins, decide what coin is to be used in each state, using the transition matrix, and based on this, flip the coin that should be used for each state.

B. Simple Data-Parallel Sampling from M Dirichlet Distributions

The algorithm in 2 presents a simple way to draw from a number of Dirichlet distributions in parallel on a GPU. It works well if the number $M$ is very large. On the contrary, it is a bottleneck if $M$ is small or much lesser than the dimension of the Dirichlet distributions.

C. Experimental study

This section contains additional data from the benchmarks.

C.1. Multivariate Regression

In our regression experiment, we compare Augur against two other models, one implemented in Jags (11) and one in Stan (12). These models are both based upon the BMLR code developed by Kruschke (Kruschke, 2010). Each system uses the same priors and hyperparameters.

The regression experimental protocol was as follows: each dataset had 10 90%/10% train/test splits generated, and each dataset was tested using 10 different random initialisations across each of the train/test splits. Then the number of samples was varied between 100, 200, 500, 1000, 2000, 5000[3]. This gives a total of 600 runs of each system on each dataset. The presented figures average across both the random seeds and the train/test splits to produce one point per number of samples. We then plot average RMSE on the test sets against average runtime.

In figures 13, 14, 15 and 16 we present results on the Concrete compressive, winequality-red, winequality-white and Yacht Hydrodynamics datasets from the UCI repository (Bache & Lichman, 2013). In Concrete and Yacht we present results from JAGS, Stan and Augur. On the winequality experiments we only present results from JAGS and Augur due to machine time constraints (Stan's runtime was too high to perform sufficiently many experiments on larger datasets). JAGS is using a Gibbs sampler for the weights and the bias, and uses a slice sampler for the variance of the noise. Augur uses random walk Metropolis-Hastings, and Stan is using the No-U-Turn variant of Hamiltonian Monte Carlo. We can see that Augur has a startup cost of about 10 seconds, and Stan has a startup cost of about 20 seconds. After that point Augur can draw samples more quickly than both Stan and JAGS, though due to JAGS's low startup time ($\lt 1$ second) it is only on large datasets with many samples that Augur provides a speedup.

The RMSEs of JAGS and Augur converge to approximately similar values, though Augur takes longer to converge (in terms of the number of samples, and total runtime) as Metropolis-Hastings is a less efficient inference algorithm for regression than a tuned Gibbs sampler. As mentioned in section 5 of the paper JAGS has a special case for working with linear regression models which alters the sampling procedure, and this feature is not currently available in Augur.

We find that the regression results show that Augur is competitive with other systems, though linear regression models tend not to be large enough to properly exploit all the computation available in the GPU.

---
[3] Stan and JAGS had a burn in of an additional 50% samples to allow for the adaptive tuning of the samplers, without these extra samples for adaptation the performance of both of them was poor. Augur's Metropolis-Hastings algorithm does not use such tuning.

Augur: a Modeling Language for Data-Parallel Probabilistic Inference

```
1  object NaiveBayesClassifier {
2
3    class sig(var c: Array[Int], var f: Array[Int], var pC: Double, var pFgivenC: Array[Double])
4
5    val model = bayes {
6      (N: Int, K: Int) => {
7
8      val pC = Beta(0.5,0.5).sample()
9      val c = Bernoulli(pC).sample(N)
10
11     val pFgivenC = Beta(0.5,0.5).sample(K*2)
12
13     val f = for(i <- 1 to N) {
14             for(j <- 1 to K) {
15                Bernoulli(pFgivenC(j * 2 + c(i))).sample()
16             }
17         }
18
19     observe(f, c)
20     }
21   }
22 }
```

Figure 9. Specification of a naive Bayes classifier

```
1  object HiddenMarkovModel {
2    class sig(var flips: Array[Int], var bias: Array[Double], var transition_matrix: Array[Double], var
            MC_states: Array[Int])
3
4    val model = bayes {
5      (N: Int, number_states: Int) => {
6      val v = vector(number_states,0.1)
7      val transition_matrix = Dirichlet(number_states,v).sample(number_states)
8      val bias = Beta(1.0,1.0).sample(number_states)
9
10     val MC_states: IndexedSeq[Int] = for (i <- 1 to N) yield Categorical(number_states,transition_matrix
            (MC_states(max(0, i-1)))).sample()
11
12     val flips = for (i <- 1 to N) Bernoulli(bias(MC_states(i))).sample()
13
14     observe(flips)
15     }
16   }
17 }
```

Figure 10. Specification of a Hidden Markov Model

```
1  model {
2     for( i in 1:N ) {
3       y[i] ~ dnorm( y.hat[i] , 1/tau )
4       y.hat[i] <- b0 + inprod( b[1:nPred] , x[i,1:nPred] )
5     }
6     tau ~ dgamma( 1 , 1 )
7     b0 ~ dnorm( 0 , 0.01 )
8     for ( j in 1:nPred ) {
9       b[j] ~ dnorm( 0 , 0.01 )
10    }
11 }
```

Figure 11. Multivariate Regression in Jags

```
1   data {
2     int<lower=0> nPred;
3     int<lower=0> nData;
4     real y[nData];
5     matrix[nData,nPred] x;
6     vector[nData] b0vec;
7   }
8   parameters {
9     real b0;
10    vector[nPred] b;
11    real<lower=0> tau;
12  }
13  transformed parameters {
14    vector[nData] mu;
15    vector[nData] offset;
16    offset <- b0vec * b0;
17    mu <- x * b + offset;
18  }
19  model {
20    b0 ~ normal(0,10);
21    tau ~ gamma(1,1);
22    for (d in 1:nPred)
23      b[d] ~ normal(0,10);
24    y ~ normal(mu, 1/sqrt(tau));
25  }
```

Figure 12. Multivariate Regression in Stan

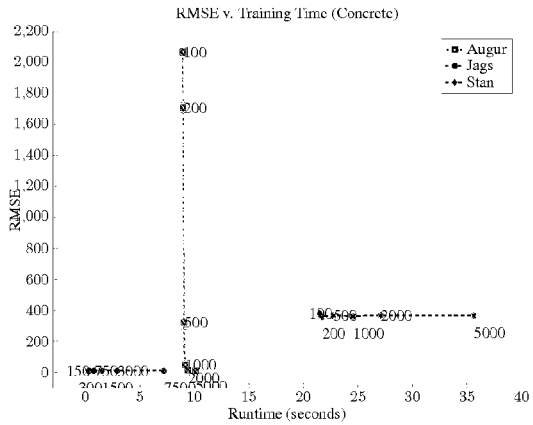

Figure 13. Result of Multivariate Regression on the Concrete Compressive Strength data set.

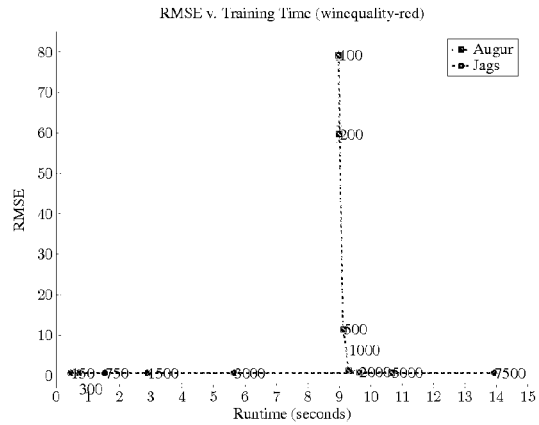

Figure 14. Result of Multivariate Regression on the winequality-red data set.

C.2. Gaussian Mixture Model

The Gaussian Mixture Model results presented in section 5 of the paper show how each of the three systems scale as the dataset size is increased. We sampled 100,000 datapoints from two different mixture distributions: one with 4 gaussians centered at {-5,-1,1,5} with standard deviation {1,0.1,2,1}, and one with 3 gaussians centered at {-5, 0, 5} with standard deviations {0.1,0.1,0.1}. Each dataset had a flat mixing distribution, that is draws from each gaussian were equiprobable. From each dataset we subsampled smaller datasets using 100, 1000 and 10,000 datapoints.

We used the GMM presented in the paper for Augur, for Stan we used the GMM listed in the modelling handbook, and for JAGS we wrote a standard GMM (shown in figure 17, based upon Augur's. Each model used the same prior distributions and hyperparameters.

Figure 4 in the paper is from the dataset with 4 centres. In figure 18 we show the runtime of the remaining dataset with 3 centres. For computational reasons we stopped Stan's final run after 3 hours (Stan took approx. 6 hours to complete on the first dataset). Here we can see that Augur's runtime scales much more slowly as the dataset size is increased. JAGS remains reasonably competitive until 100,000 data points, at which point Augur is faster by a factor of 7. Stan

Augur: a Modeling Language for Data-Parallel Probabilistic Inference

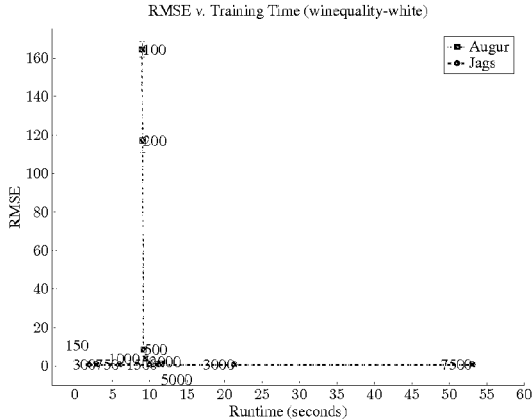

Figure 15. Result of Multivariate Regression on the winequality-white data set.

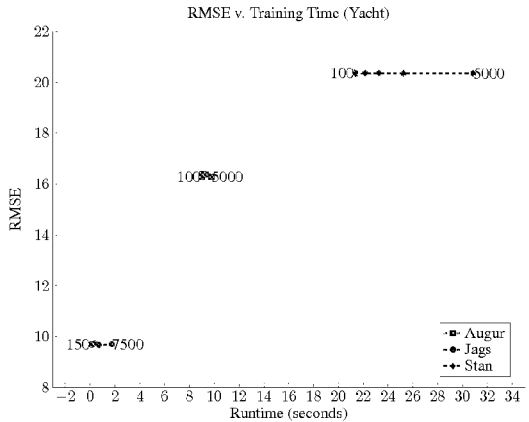

Figure 16. Result of Multivariate Regression on the Yacht Hydrodynamics data set.

is also relatively competitive but scales extremely poorly as the number of datapoints is increased.

C.3. LDA

In an attempt to confirm the result presented in the paper, we present another result (figure 19) measuring the predictive probability averaging across multiple runs using different train/test splits. In this experiment, we averaged across 10 runs with different train/test splits and present the timings with error bars. We also ran an experimentment across 10 different random initializations and seeds, and all algorithms again showed robustness to the variation. We reduced the maximum number of samples to 512 as generating results for the Collapsed Gibbs sampler was proving prohibitive in terms of runtime for repeated experiments.

```
1  model {
2    for (i in 1:N){
3      z[i] ~ dcat(theta)
4      y[i] ~ dnorm(mu[z[i]],sigma[z[i]])
5    }
6    theta[1:K] ~ ddirch(alpha)
7    for (k in 1:K) {
8      alpha[k] <- 1
9      mu[k] ~ dnorm(0,0.01)
10     sigma[k] ~ dgamma(1,1)
11   }
12 }
```

Figure 17. GMM in Jags

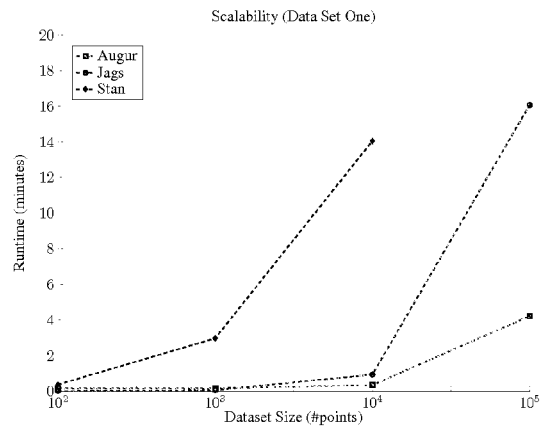

Figure 18. Evolution of runtime to draw a thousand samples for varying data set sizes for a Gaussian Mixture Model. Stan's $100,000$ data point was not generated.

A third experiment (figure 20) reports on the natural logarithm of run time in milliseconds to draw 512 samples as the number of topics varies. The sparse implementation's running time does not increase as quickly as Augur's as the number of topics increases. As a result, it runs faster when the number of topics is large. This is because Augur's Gibbs sampler is linear in the number of topics during the step of sampling each of the $z_{i,j}$. The collapsed Gibbs sampler's performance worsen when the number of topics is increased, as seen in our results and in the experiments in (Yao et al., 2009). Again, Augur's generated code is on par with the hand-written CUDA implementation.

We experimented with the SparseLDA implementation which forms Factorie's standard LDA model, but this implementation proved to be unreliable. The predictive probability measure actually decreased as more samples were drawn using the SparseLDA implementation. We are working with the developers of Factorie to investigate this problem. The SparseLDA implementation is interesting as it uses a set of LDA specific assumptions to generate a highly optimised Gibbs sampler. We found Augur to be competitive in terms of runtime when drawing more than 256 samples. With smaller sample sizes there is insufficient computation to amortize the compilation costs.
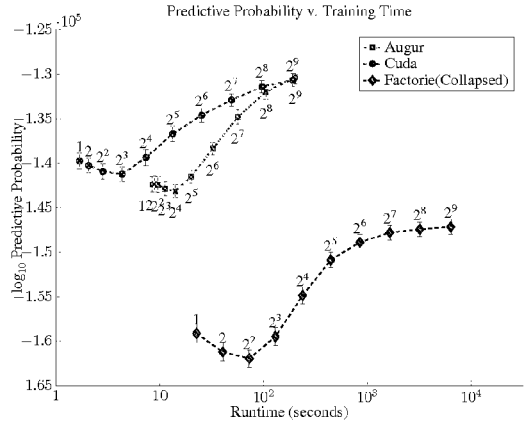
Figure 19. Average over 10 runs of the evolution of the predictive probability over time.
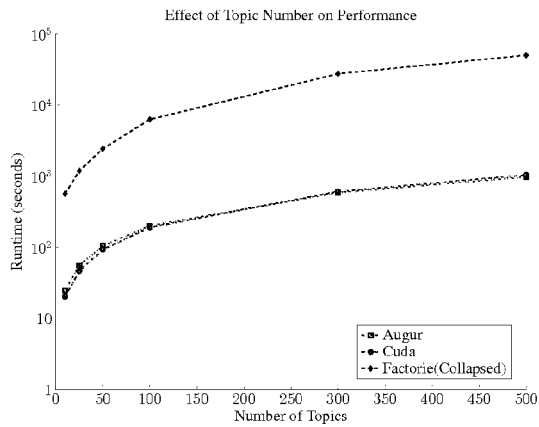
Figure 20. Comparison of scalability of Augur, hand-written CUDA, and Factorie's collapsed Gibbs w.r.t the number of topics.

What is claimed is:

1. A method comprising:
compiling source code, representing a model of a body of data, into an intermediate representation of the model;
wherein the model of the body of data specifies one or more probability distributions;
wherein the intermediate representation of the model represents at least one probability distribution, of the one or more probability distributions, with one or more mathematical expressions;
identifying a particular inference algorithm of a plurality of inference algorithms; and
producing inference code that implements the particular inference algorithm;
wherein the inference code is configured to sample from the at least one probability distribution of the one or more probability distributions; and
wherein producing the inference code is based, at least in part, on an analysis of the one or more mathematical expressions;
wherein the method is performed by one or more computing devices.

2. The method of claim 1 further comprising:
prior to producing the inference code, performing the analysis of the one or more mathematical expressions;
wherein performing the analysis of the one or more mathematical expressions comprises identifying one or more features of the at least one probability distribution that are represented in the one or more mathematical expressions.

3. The method of claim 1, further comprising:
prior to identifying the particular inference algorithm, receiving information indicating one or more rules for analyzing intermediate representations of models;
wherein the one or more rules are specific to the particular inference algorithm.

4. The method of claim 3 further comprising:
prior to producing the inference code, performing the analysis of the one or more mathematical expressions;
wherein performing the analysis of the one or more mathematical expressions comprises:
rewriting the one or more mathematical expressions based, at least in part, on the one or more rules that are specific to the particular inference algorithm, to produce one or more transformed mathematical expressions, and
identifying features of the at least one probability distribution based, at least in part, on analysis of the one or more transformed mathematical expressions.

5. The method of claim 1, further comprising performing the analysis of the one or more mathematical expressions without materializing, in computer memory, values for data points of a graphical representation of the at least one probability distribution.

6. The method of claim 1 further comprising:
identifying a second inference algorithm, of the plurality of inference algorithms; and
producing second inference code that implements the second inference algorithm;
wherein the second inference code is configured to sample from the at least one probability distribution of the one or more probability distributions; and
wherein producing the second inference code is based, at least in part, on a second analysis of the one or more mathematical expressions.

7. The method of claim 6 wherein:
the inference code is first inference code;
the first inference code, implementing the particular inference algorithm, explores all of the one or more probability distributions specified in the model of the body of data; and
the second inference code, implementing the second inference algorithm, explores all of the one or more probability distributions specified in the model of the body of data.

8. The method of claim 1 further comprising:
identifying a second inference algorithm, of the plurality of inference algorithms; and
producing second inference code that implements the second inference algorithm;
wherein the second inference code is configured to sample from a second probability distribution of the one or more probability distributions;
wherein the second probability distribution is not a probability distribution of the at least one probability distribution; and
wherein producing the second inference code is based, at least in part, on a second analysis of the one or more mathematical expressions.

9. The method of claim 1 further comprising:
performing the analysis of the one or more mathematical expressions;
wherein performing the analysis of the one or more mathematical expressions comprises identifying independencies between variables in the one or more mathematical expressions; and
wherein producing the inference code comprises building parallelism into the inference code based, at least in part, on the identified independencies.

10. The method of claim 9 wherein performing the analysis of the one or more mathematical expressions further comprises rewriting the one or more mathematical expressions based, at least in part, on one or more rewrite rules that are specific to a class of the at least one probability distribution, to produce one or more transformed mathematical expressions.

11. One or more non-transitory computer-readable media storing instructions that, when executed by one or more processors, cause:
compiling source code, representing a model of a body of data, into an intermediate representation of the model;
wherein the model of the body of data specifies one or more probability distributions;
wherein the intermediate representation of the model represents at least one probability distribution, of the one or more probability distributions, with one or more mathematical expressions;
identifying a particular inference algorithm of a plurality of inference algorithms; and
producing inference code that implements the particular inference algorithm;
wherein the inference code is configured to sample from the at least one probability distribution of the one or more probability distributions; and
wherein producing the inference code is based, at least in part, on an analysis of the one or more mathematical expressions.

12. The one or more non-transitory computer-readable media of claim 11 wherein the instructions further comprise instructions that, when executed by one or more processors, cause:

prior to producing the inference code, performing the analysis of the one or more mathematical expressions;
wherein performing the analysis of the one or more mathematical expressions comprises identifying one or more features of the at least one probability distribution that are represented in the one or more mathematical expressions.

13. The one or more non-transitory computer-readable media of claim 11, wherein the instructions further comprise instructions that, when executed by one or more processors, cause:
prior to identifying the particular inference algorithm, receiving information indicating one or more rules for analyzing intermediate representations of models;
wherein the one or more rules are specific to the particular inference algorithm.

14. The one or more non-transitory computer-readable media of claim 13 wherein the instructions further comprise instructions that, when executed by one or more processors, cause:
prior to producing the inference code, performing the analysis of the one or more mathematical expressions;
wherein performing the analysis of the one or more mathematical expressions comprises:
rewriting the one or more mathematical expressions based, at least in part, on the one or more rules that are specific to the particular inference algorithm, to produce one or more transformed mathematical expressions, and
identifying features of the at least one probability distribution based, at least in part, on analysis of the one or more transformed mathematical expressions.

15. The one or more non-transitory computer-readable media of claim 11, wherein the instructions further comprise instructions that, when executed by one or more processors, cause performing the analysis of the one or more mathematical expressions without materializing, in computer memory, values for data points of a graphical representation of the at least one probability distribution.

16. The one or more non-transitory computer-readable media of claim 11 wherein the instructions further compromise instructions that, when executed by one or more processors, cause:
identifying a second inference algorithm, of the plurality of inference algorithms; and
producing second inference code that implements the second inference algorithm;
wherein the second inference code is configured to sample from the at least one probability distribution of the one or more probability distributions; and
wherein producing the second inference code is based, at least in part, on a second analysis of the one or more mathematical expressions.

17. The one or more non-transitory computer-readable media of claim 16 wherein:
the inference code is first inference code;
the first inference code, implementing the particular inference algorithm, explores all of the one or more probability distributions specified in the model of the body of data; and
the second inference code, implementing the second inference algorithm, explores all of the one or more probability distributions specified in the model of the body of data.

18. The one or more non-transitory computer-readable media of claim 11 wherein the instructions further comprise instructions that, when executed by one or more processors, cause:
identifying a second inference algorithm, of the plurality of inference algorithms; and
producing second inference code that implements the second inference algorithm;
wherein the second inference code is configured to sample from a second probability distribution of the one or more probability distributions;
wherein the second probability distribution is not a probability distribution of the at least one probability distribution; and
wherein producing the second inference code is based, at least in part, on a second analysis of the one or more mathematical expressions.

19. The one or more non-transitory computer-readable media of claim 11 wherein the instructions further comprise instructions that, when executed by one or more processors, cause:
performing the analysis of the one or more mathematical expressions;
wherein performing the analysis of the one or more mathematical expressions comprises identifying independencies between variables in the one or more mathematical expressions; and
wherein producing the inference code comprises building parallelism into the inference code based, at least in part, on the identified independencies.

20. The one or more non-transitory computer-readable media of claim 19 wherein performing the analysis of the one or more mathematical expressions further comprises rewriting the one or more mathematical expressions based, at least in part, on one or more rewrite rules that are specific to a class of the at least one probability distribution, to produce one or more transformed mathematical expression.

* * * * *

UNITED STATES PATENT AND TRADEMARK OFFICE
CERTIFICATE OF CORRECTION

PATENT NO.         : 10,496,929 B2
APPLICATION NO.    : 14/316186
DATED              : December 3, 2019
INVENTOR(S)        : Tristan et al.

Page 1 of 1

It is certified that error appears in the above-identified patent and that said Letters Patent is hereby corrected as shown below:

In the Specification

In Column 13, Line 11, delete "Bernouilli," and insert -- Bernoulli, --, therefor.

In Column 15, Line 39, delete "xkillplane" and insert -- x-y plane --, therefor.

In the Claims

In Column 53, Lines 42-43, in Claim 16, delete "compromise" and insert -- comprise --, therefor.

In Column 54, Line 50, in Claim 20, delete "expression." and insert -- expressions. --, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*